(12) United States Patent
Dutta et al.

(10) Patent No.: US 9,003,346 B1
(45) Date of Patent: Apr. 7, 2015

(54) STABILITY IMPROVEMENTS FOR TIMING-DRIVEN PLACE AND ROUTE

(71) Applicant: Cypress Semiconductor Corporation, San Jose, CA (US)

(72) Inventors: Avijit Dutta, Tigard, OR (US);
Krishnan Anandh, San Jose, CA (US);
Steven Danz, Tigard, OR (US); Neil Tuttle, Beaverton, OR (US); Ryan Morse, Beaverton, OR (US); Haneef Mohammed, Beaverton, OR (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/801,791

(22) Filed: Mar. 13, 2013

Related U.S. Application Data

(60) Provisional application No. 61/680,378, filed on Aug. 7, 2012, provisional application No. 61/653,309, filed on May 30, 2012, provisional application No. 61/648,497, filed on May 17, 2012.

(51) Int. Cl.
*G06F 17/50* (2006.01)

(52) U.S. Cl.
CPC .................................. *G06F 17/5072* (2013.01)

(58) Field of Classification Search
USPC .......................................................... 716/119
See application file for complete search history.

(56) References Cited

U.S. PATENT DOCUMENTS

| | | | |
|---|---|---|---|
| 5,191,534 A | 3/1993 | Orr et al. | |
| 6,301,687 B1 | 10/2001 | Jain et al. | |
| 6,581,199 B2 | 6/2003 | Tanaka | |
| 7,137,094 B2 | 11/2006 | Tien | |
| 8,060,845 B2 | 11/2011 | Herzl et al. | |
| 8,332,805 B1 | 12/2012 | Birch et al. | |
| 2002/0162086 A1* | 10/2002 | Morgan | 716/18 |
| 2009/0178013 A1* | 7/2009 | Wang et al. | 716/2 |
| 2009/0178015 A1 | 7/2009 | Federovsky et al. | |
| 2012/0144353 A1* | 6/2012 | Kamdar et al. | 716/108 |

OTHER PUBLICATIONS

Hegde, G.G., "Engineering changes and time delays: A field investigation," International Journal of Production Economics, vol. 28, Issue 3, Dec. 1992, pp. 341-352.

(Continued)

*Primary Examiner* — Paul Dinh
*Assistant Examiner* — Bryce Aisaka

(57) ABSTRACT

Techniques for reducing post-routing delay variance are described herein. In an example embodiment, an initial netlist includes multiple instances that represent digital components of an electronic design. An base signature is assigned to each instance in the initial netlist, where the base signature is based on two or more design or connectivity attributes of the instance. The base signatures are then used to generate an initial instance ordering of the instances in the initial netlist. A subsequent netlist, different from the initial netlist but representing the same electronic design, is received. Base signatures are assigned to the instances on the subsequent netlist and a subsequent instance ordering is generated. The subsequent instance ordering preserves the same order as the initial instance ordering for those instances that are included in both the initial netlist and the subsequent netlist. In this manner, any later netlist-based processing (e.g., such as packing, placement, and routing) is shielded from the negative redesign effects caused by the subsequent changes to the initial netlist and, consequently, the post-routing timing delay variance of the electronic design is reduced.

20 Claims, 11 Drawing Sheets

(56) References Cited

OTHER PUBLICATIONS

Loch, Christoph, "Accelerating the process of engineering change orders: capacity and congestion effects," Journal of Product Innovation Management, vol. 16, Issue 2, Mar. 1999, pp. 145-159.

Terwiesch, Christian, "Managing the process of engineering change orders: the case of the climate control system in automobile development," Journal of Product Innovation Management, vol. 16, Issue 2, Mar. 1999, pp. 160-172.

\* cited by examiner

STABILITY IMPROVEMENTS FOR TIMING-DRIVEN PLACE AND ROUTE

PRIORITY

This application claims the benefit and priority of U.S. Provisional Application No. 61/648,497, filed on May 17, 2012, the entire contents of which is hereby incorporated by reference as if fully set forth herein; this application also claims the benefit and priority of U.S. Provisional Application No. 61/653,309, filed on May 30, 2012, the entire contents of which is hereby incorporated by reference as if fully set forth herein; and this application also claims the benefit and priority of U.S. Provisional Application No. 61/680,378, filed on Aug. 7, 2012, the entire contents of which is hereby incorporated by reference as if fully set forth herein.

TECHNICAL FIELD

This disclosure relates to the field of electronic design automation.

BACKGROUND

Field-programmable Gate Arrays (FPGAs) and Programmable Logic Devices (PLDs) have been used in data communication and telecommunication systems. Conventional PLDs and FPGAs consist of an array of programmable elements, with the elements programmed to implement a fixed function or equation. Some currently-available Complex PLD (CPLD) products may comprise arrays of logic cells.

One of the drawbacks of conventional FPGA, PLD, and CPLD devices is the limited processing resources. For example, the area of such devices is typically dominated by the routing resources, which may consume up to 80-90% of the total area. Due to the ever-increasing design complexity, various Electronic Design Automation (EDA) programs (tools) use iterative processes to ensure that the processing resources of a target device are efficiently utilized when a design is placed and routed on the device.

Because of the increased design complexity and the iterative nature of the design process, the predictability of a design tool becomes a key issue in the placement and routing of an electronic design on a target device. In this regard, high variance in post-routing delays poses a serious threat to meeting timing constraints in Engineering Change Order (ECO) scenarios. For example, after a design is mapped to a target device and timing constraints are met, a minor ECO-type change may make the design fail timing constraints due to high variance in post-routing delays. By way of illustration, a minor ECO-type change in the pin placement, a perturbation in the initial instance order, or a delta change in the choice of a starting solution during annealing may drastically change the quality of routing (QoR) and may lead to costly and time-consuming design iterations.

DETAILED DESCRIPTION

Figure 1A:
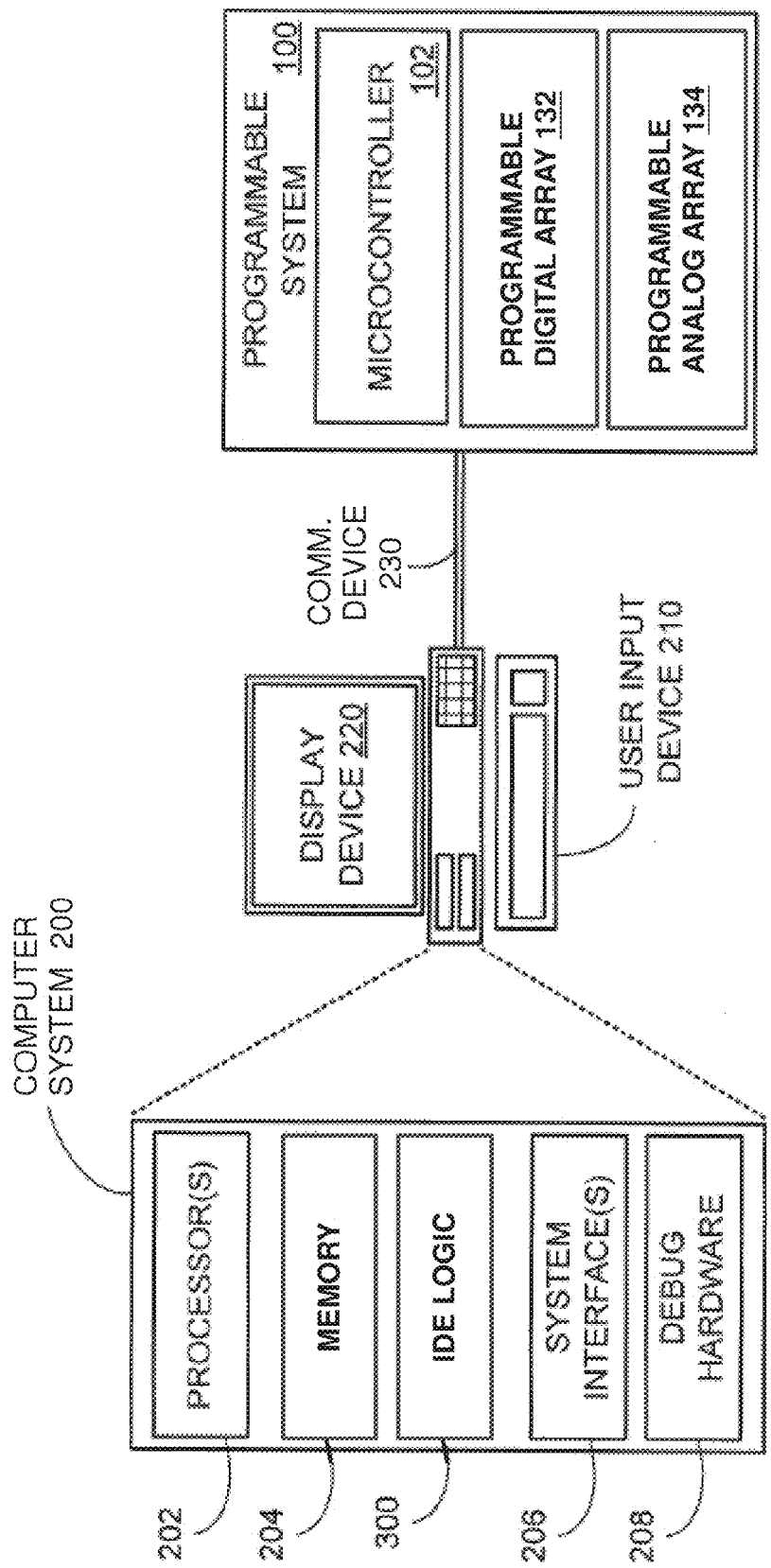
FIG. 1A illustrates an example operational context in which embodiments may be implemented.

The following description sets forth numerous specific details such as examples of specific systems, components, methods, and so forth, in order to provide a good understanding of various embodiments of the techniques for reducing post-routing delay variance described herein. It will be apparent to one skilled in the art, however, that at least some embodiments may be practiced without these specific details. In other instances, well-known components or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Further, in various embodiments the techniques for reducing post-routing delay variance described herein may comprise one or more methods that are executed by one or more computing devices or computer systems. Although the operations of such method(s) are shown and described hereinafter in a particular order, the operations of each method may be altered so that certain operations may be performed in a different order or so that certain operation may be performed, at least in part, concurrently and/or in parallel with other operations. In other embodiments, instructions or sub-operations of distinct operations may be executed in an intermittent and/or alternating manner. Thus, the various method embodiments of the described techniques, as well as the order of operations therein, are to be regarded in an illustrative rather than a restrictive sense.

I. Overview

The techniques for reducing post-routing delay variance described herein include techniques for canonical instance ordering, techniques for congestion-aware timing-driven placement, and techniques for timing-critical net-based routing.

In an example embodiment, a method for reducing post-routing delay variance is performed by a computer system. The computer system receives an initial netlist, where the netlist includes multiple instances that represent digital components of an electronic design. The computer system assigns an initial base signature to each instance on the initial netlist, where the base signature is based on two or more design or connectivity attributes of the instance. The computer system then uses the initial base signatures to generate an initial instance ordering of the instances on the initial netlist. The computer system then receives a subsequent netlist that represents the electronic design, where the subsequent netlist is different from the initial netlist. The computer system assigns base signatures to the instances on the subsequent netlist and generates a subsequent instance ordering, where the subsequent instance ordering preserves the same order as the initial instance ordering for those instances that are included in both the initial netlist and the subsequent netlist. In this manner, when any subsequent ECO changes are made to the initial netlist of the electronic design, any subsequent instance ordering preserves the order of the instances, thereby shielding the later netlist-based processing (e.g., such as packing, placement, and routing) from the negative re-design effects of the changes. As a result, the post-routing timing delay variance caused by the changes is reduced.

In an example embodiment, a method for generating instance signatures is performed by a computer system. The computer system receives a netlist that includes a list of multiple instances that represent digital components of an electronic design. For each instance on the list, the computer system generates a base signature and a fan-in signature, and then combines the base signature and the fan-in signature to generate a combined signature for that instance. The computer system sorts the instances based on their combined signatures into a canonical ordering, and stores the canonical ordering of the instances in, or in association with, the netlist.

In an example embodiment, a method for congestion-aware timing-driven placement of an electronic design is performed by a computer system. The computer system determines a first state of the design by assigning a first instance, representing a first component, to a first location on an asymmetrical architecture that represents the organization of a set of physical resources (e.g., such as a digital block array) of a programmable target device. The asymmetrical architecture comprises multiple control logic blocks, multiple horizontal (H) channels each having a given capacity, and multiple vertical (V) channels each having a given capacity, where the H channels' capacity is different from the V channels' capacity. After determining the first state of the design, the computer system computes a first placement cost, which includes a first congestion cost, for the first state of the design. The computer system then determines a second state of the design by assigning a second instance, representing a second component, to a second location on the asymmetrical architecture. The computer system computes a second placement cost, which includes a second congestion cost, for the second state of the design. The computer system then computes a delta change as a difference between the first placement cost and the second placement cost, and decides whether to accept or to reject the second state of the design based on the delta change. Since the congestion costs are accounted for in the placement costs, any congestion that may be caused by the asymmetry of the architecture of the programmable target device is automatically accounted for during the placement of the components, which in turn reduces the timing delay variance that is computed after a later routing operation.

In an example embodiment, a method for timing-critical net-based routing is performed by a computer system. After performing placement to assign instances of digital components to locations on the architecture of a programmable target device, the computer system performs routing by allocating routing resources to connect the nets that include the instances of the digital components. As part of performing routing, the computer system determines the timing-critical priorities for multiple nets that are represented by the placed instances, and then iteratively routes the multiple nets based on their timing-critical priorities, where at each iteration a net having a higher timing-critical priority is routed before another net that has a lower timing-critical priority. In this manner, it is ensured that timing-critical nets are routed first, thereby reducing the timing delay variance in the final routing.

In an example embodiment, a method for reducing post-routing delay variance may comprise a combination of operations that include two or more of the canonical instance ordering, congestion-ware annealing-based placement, and timing-critical net-based routing operations that are described herein.

In other embodiments, the techniques for reducing post-routing delay variance described herein may be embodied as a set of instructions that are stored on non-transitory computer-readable storage media. Such instructions, when executed by one or more processors, cause the one or more processors to perform the methods described herein. In yet other embodiments, the techniques described herein may be embodied as an apparatus comprising one or more processors and non-transitory media that stores a set of instructions. The set of instructions, when executed by the one or more processors, causes the apparatus to perform the methods described herein.

II. Examples of Operational Contexts, Programmable Target Devices, and Design Automation Flows FIG. 1A illustrates an example operational context in which embodiments of the techniques for reducing post-routing delay variance described herein may be implemented.

Referring to FIG. 1A, an exemplary programmable system 100 is configured and/or programmed by computer system 200. Programmable system 100 includes microcontroller 102 and configurable hardware components, such as programmable array of digital blocks 132 and possibly programmable array of analog blocks 134. Microcontroller 102 can be programmed (and re-programmed) and the programmable digital and analog arrays 132 and 134 can be configured (and reconfigured) to implement various applications and to perform a variety of functions.

An exemplary computer system 200 may be configured and/or programmed to execute processing logic that is configured and operable to perform the described techniques for reducing post-routing delay variance. As used herein, "logic" refers to a set of instructions which, when executed by one or more processors, are configured and operable to perform one or more functionalities. In various embodiments and implementations, any such logic may be implemented as one or more software components that are executable by one or more processors (e.g., such as central processing units, or CPUs), as one or more hardware components (e.g., such as Application-Specific Integrated Circuits, or ASICs), or as any combination of one or more software and hardware components. For example, any particular logic may be implemented, without limitation, as a standalone and/or client-server software application, as one or more software modules, as one or more libraries of functions, as one or more dynamically linked libraries, as one or more active X controls, and/or as one or more browser plug-ins. Further, in various embodiments the functionalities of any particular logic may be implemented in the same integrated module or may be combined in two or more modules that may provide some additional functionality. When executed on a computer system or in a distributed computing environment, a particular logic may be embodied as one or more computer processes, threads, or any other run-time entities that are allocated computing resources (e.g., such as memory, CPU time, persistent storage, and network bandwidth) to perform the logic's functionalities.

As illustrated in FIG. 1A, computer system 200 is configured to execute integrated development environment (IDE) logic 300, allowing for unified hardware and software development and for configuration of programmable system 100 with hardware configuration files and software programming. Computer system 200 can include one or more processors 202 to execute IDE logic 300, for example, by executing instructions stored in memory 204 or in other computer-readable volatile and/or non-volatile storage media.

After hardware configuration files and software programming are generated, computer system 200 can program and/or configure programmable system 100 with the developed hardware configuration and software programming, for example, through communication device 230. In some embodiments, device 230 can be a wired device, such as a Universal Serial Bus (USB) device, network interface card (e.g., such as Ethernet card), and the like, or it can be a wireless communication device that can establish a wireless link between computer system 200 and programmable system 100.

Computer system 200 may also include system interface(s) 206 that allow the computer system to communicate with external devices, such as user input device 210, display device 220, and programmable system 100. For example, computer system 200 may include a system interface 206 to communicate with programmable system 100 over communication device 230. In some embodiments, system interface(s) 206 can receive inputs, for example, through input device 210, and present information, for example, via display device 220.

Computer system 200 and/or IDE logic 300 can generate hardware configuration and/or software applications for programmable system 100 in response to user input, for example, from input device 210. IDE logic 300 can include various development tools and/or programs that allow system designers to describe hardware circuitry for programmable system 100, and to implement and provide software or firmware code for microcontroller 102. In some embodiments, IDE logic 300 can receive hardware description code that describes this hardware circuitry in an abstracted or generic manner, and can convert the generic code into device-specific configuration files that are particular to the architecture and/or resources of programmable system 100. The hardware description code provided by the system designers may include schematic circuit diagrams and/or hardware code written according to a hardware description language, such as Verilog or VHDL.

Computer system 200 and/or IDE logic 300 can also generate application programming interfaces (APIs) based at least in part on the hardware description code. These APIs, when provided to programmable system 100, can program microcontroller 102 to communicate with programmable digital and analog arrays 132 and 134 that are configured according to the device-specific configuration files.

Computer system 200 and/or IDE logic 300 can send the device-specific configuration files and the application programming interfaces to programmable system 100. Programmable system 100 can utilize the configuration files to configure particular hardware components in the programmable digital and/or analog arrays 132 and 134 to implement the hardware circuitry described by the hardware description code. Programmable system 100 can utilize the application programming interfaces to program the microcontroller 102 to communicate with the programmable digital and/or analog arrays 132 and 134 that are configured according to the device-specific configuration files.

After programmable system 100 has been programmed with the hardware configuration and software or firmware programming developed with IDE logic 300, computer system 200 can execute debug hardware 208 to perform debugging operations on programmable system 100. In some embodiments, debug hardware 208 can be located externally from computer system 200 and can communicate with the computer system via a system interface 206.

In various embodiments, a computer system such as computer system 200 may execute instructions to configure (and re-configure) various target devices. Examples of such devices include, but are not limited to, FPGAs, PLDs, and CPLDs. In some embodiments, the computer system may execute instructions to configure (and re-configure) various programmable systems-on-chip or other electronic systems that include one or more processors, microcontrollers, or other processing devices that have configurable hardware components, such as, for example, programmable digital and/or analog arrays.

One example of such programmable system-on-chip is a device from the Programmable System-on-Chip (PSoC™) family of products offered by Cypress Semiconductor Corporation of San Jose, Calif. A computer system, such as computer system 200, can execute processing logic that allows designers to develop applications for, and program, both the configurable hardware components and the microcontroller of the PSoC™ device.

Figure 1B:
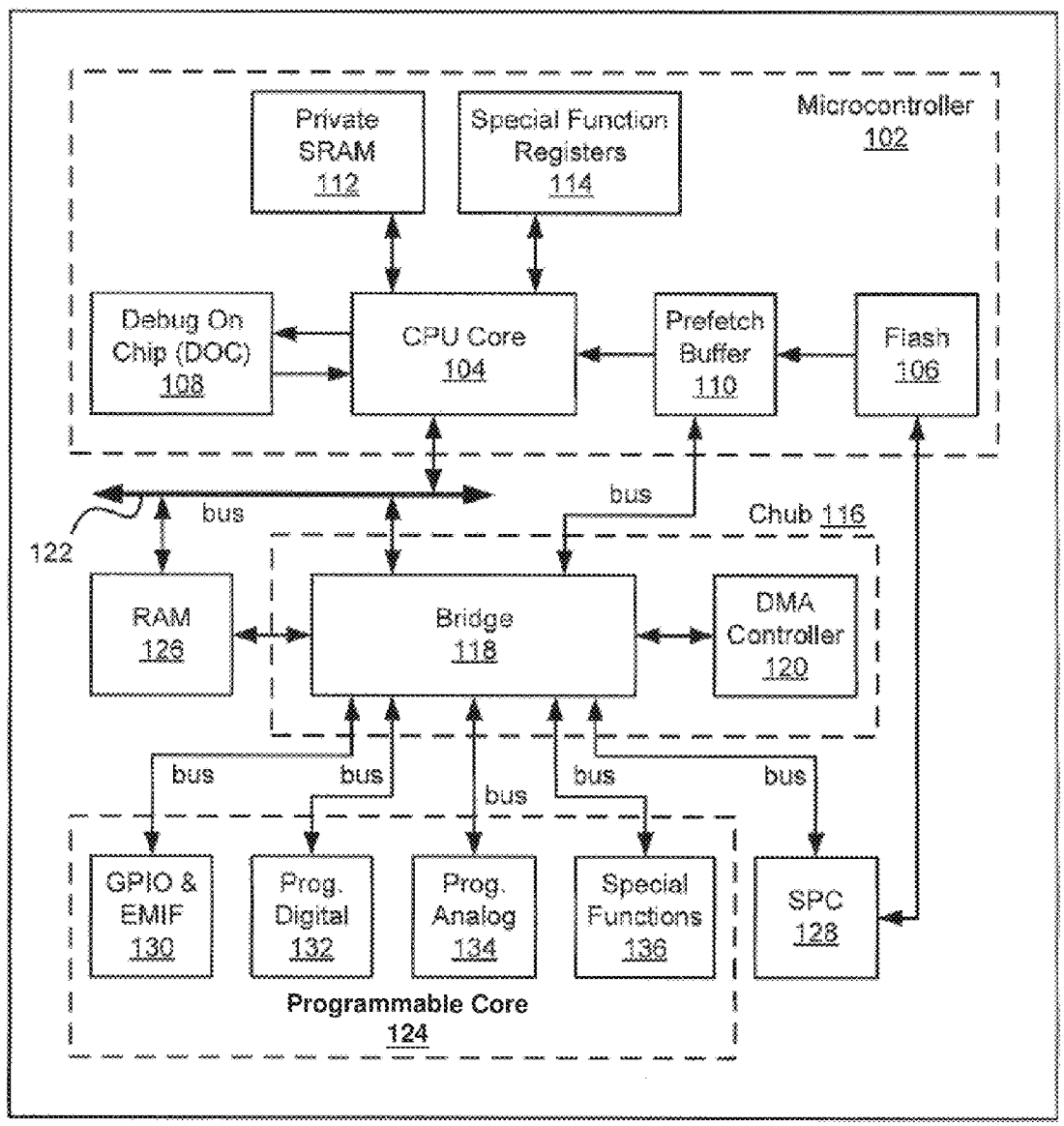
FIG. 1B is a block diagram illustrating an example programmable target device for which various embodiments may be implemented.

FIG. 1B illustrates an example embodiment of a programmable system-on-chip device 101. Device 101 includes microcontroller 102. Microcontroller 102 includes CPU core 104 (which may include one or more processors), flash program storage 106, DOC (Debug-On-Chip) 108, prefetch buffer 110, private SRAM (Static Random Access Memory) 112, and special functions registers 114. In an embodiment, DOC 108, prefetch buffer 110, private SRAM 112, and special function registers 114 may be coupled to CPU core 104, while flash program storage 106 may be coupled to prefetch buffer 110. Flash program storage 106 can be any type of program memory.

Device 101 may also include CHub (Core Hub) 116, which may include bridge 118 (e.g., such as a single-level or multi-level Advanced High-Performance Bus Bridge) and optionally a DMA (Direct Memory Access) controller 120 that is coupled to microcontroller 102 via bus 122. CHub 116 may provide the primary data and control interface between microcontroller 102 and its peripherals and memory, and programmable core 124. DMA controller 120 may be programmed to transfer data between system elements without burdening CPU core 104. In various embodiments, each of these subcomponents of microcontroller 102 and CHub 116 may be different with each choice or type of CPU core 104. CHub 116 may also be coupled to shared SRAM 126 and SPC (System Performance Controller) 128. Private SRAM 112 is independent of the shared SRAM 126, which is accessed by microcontroller 102 through bridge 118. CPU core 104 accesses the private SRAM 112 without going through bridge 118, thus allowing local register and RAM accesses to occur simultaneously with DMA access to shared SRAM 126. Although labeled here as SRAM, these memory modules may be any suitable type of a wide variety of (volatile or nonvolatile) memory or data storage modules in various other embodiments.

In various embodiments and implementations, programmable core 124 may include various combinations of subcomponents (not shown), including, but not limited to, global routing channels, digital processing channels, digital peripherals, analog processing channels, analog peripherals, DMA controller(s), SRAM and other appropriate types of data storage, 10 ports, and other suitable types of subcomponents. In the example embodiment illustrated in FIG. 1A, programmable core 124 includes GPIO (General Purpose IO) and EMIF (Extended Memory Interface) block 130 to provide a mechanism to extend the external off-chip access of microcontroller 102, programmable digital array 132, programmable analog array 134, and special functions array 136, each configured to implement one or more of the subcomponent functions. In various embodiments, special functions array 136 may include dedicated (non-programmable) functional blocks and/or one or more interfaces to dedicated functional blocks, such as a USB, a crystal oscillator drive, a JTAG (Joint Test Action Group) interface, and the like.

Programmable digital array 132 may include an array of digital logic blocks and associated routing. In one embodiment, the digital block architecture is comprised of UDBs (Universal Digital Blocks). For example, each UDB may include an ALU (Arithmetic Logic Unit) together with CPLD functionality or other types of digital programmable logic functions.

In various embodiments, one or more UDBs of programmable digital array 132 may be configured to perform various digital functions, including, but not limited to, one or more of the following functions: a basic I²C slave; an I²C master; a SPI (Serial Peripheral Interface) master or slave; a multi-wire (e.g., 3-wire) SPI master or slave (e.g., MISO/MOSI multiplexed on a single pin); timers and counters (e.g., a pair of 8-bit timers or counters, a 16-bit timer or counter, a 8-bit capture timer, or the like); pulse-width modulators, or PWMs (e.g., a pair of 8-bit PWMs, a 16-bit PWM, a 8-bit deadband PWM, or the like); a level sensitive 110 interrupt generator; a quadrature encoder; an Universal Asynchronous Receiver/Transmitter, or UART (e.g., half-duplex); delay lines; and any other suitable type of digital function or combination of digital functions which can be implemented in one or more UDBs.

In other embodiments, additional functions may be implemented using a group of two or more UDBs. Merely for purposes of illustration and not limitation, the following functions may be implemented using multiple UDBs: an I²C slave that supports hardware address detection and the ability to handle a complete transaction without CPU core intervention and to help prevent the force clock stretching on any bit in the data stream; an I²C multi-master which may include a slave option in a single block; an arbitrary length cyclical redundancy check, or CRC (e.g., up to 32 bits); secure digital input/output, or SDIO; serial general purpose input/output, or SGPIO; a digital correlator (e.g., having up to 32 bits with 4× over-sampling and supporting a configurable threshold); a LIN (Local Interconnect Network) bus interface; a delta-sigma modulator (e.g., for class D audio DAC having a differential output pair); an integrated interchip sound, or I²S (stereo); a liquid crystal display, or LCD, drive control (e.g., UDBs may be used to implement timing control of the LCD drive blocks and provide display RAM addressing); full-duplex UART (e.g., 7-, 8- or 9-bit with 1 or 2 stop bits and parity, and RTS/CTS support); a capture timer (e.g., 16-bit or the like); a deadband PWM (e.g., 16-bit or the like); a system management bus, or SMbus (including formatting of SMbus packets with CRC in software); a brushless motor drive (e.g., to support 6/12 step commutation); auto BAUD rate detector and generator (e.g., automatically determine BAUD rate for standard rates from 1200 to 115200 BAUD and after detection to generate required clock to generate BAUD rate); and any other suitable type of digital function or combination of digital functions which can be implemented in multiple UDBs.

Programmable analog array 134 may include analog resources including, but not limited to, comparators, mixers, PGAs (Programmable Gain Amplifiers), TIAs (Trans-Impedance Amplifiers), ADCs (analog-to-digital converters), DACs (digital-to-analog converters), voltage references, current sources, sample and hold circuits, and any other suitable type of analog resources. Programmable analog array 134 may support various analog functions including, but not limited to, analog routing, LCD drive IO support, capacitive sensing, voltage measurement, motor control, current to voltage conversion, voltage to frequency conversion, differential amplification, light measurement, inductive position monitoring, filtering, voice coil driving, magnetic card reading, acoustic doppler measurement, echo-ranging, modem transmission and receive encoding, or any other suitable type of analog function.

Figure 2:
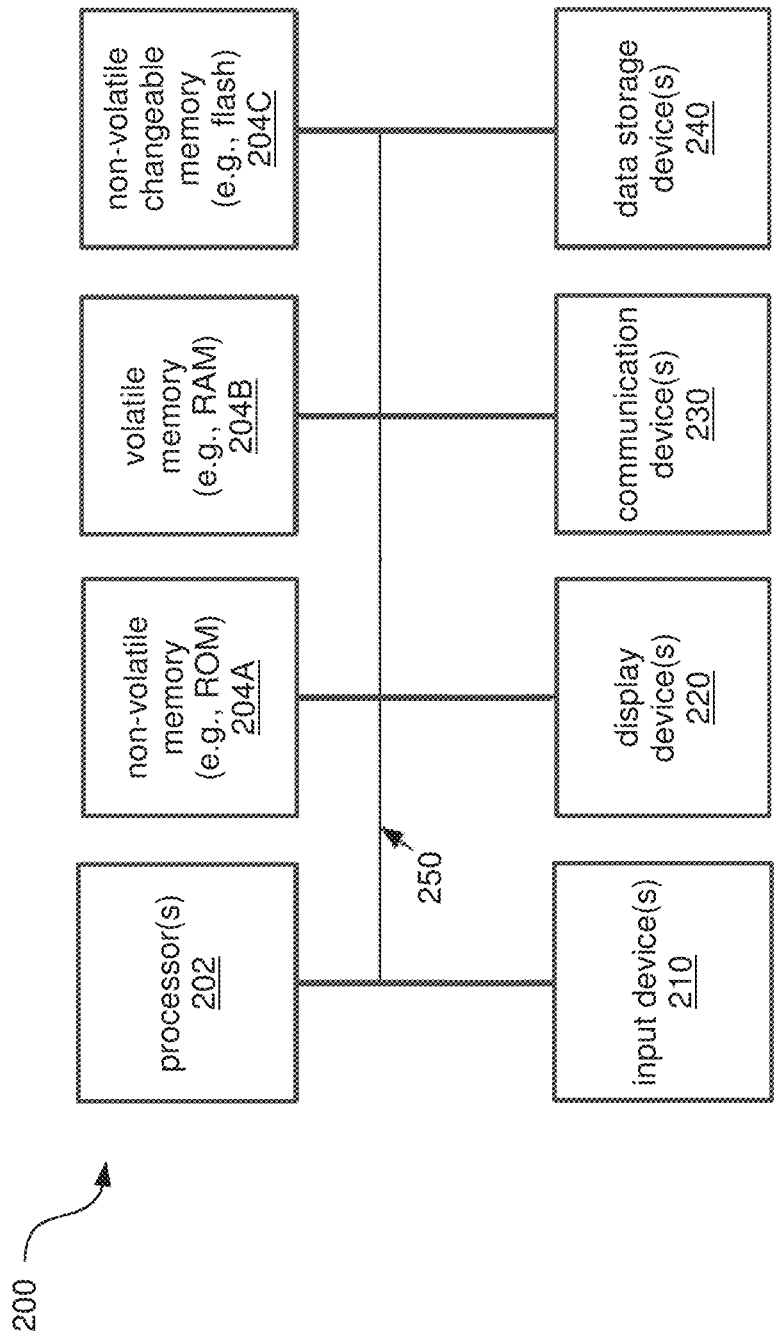
FIG. 2 is a block diagram illustrating an example computing device on which various embodiments may be implemented.

FIG. 2 illustrates basic hardware components that may be included in computer system 200, which may form a hardware platform for executing an IDE logic or other application development tools, according to example embodiments of the techniques for reducing post-routing delay variance described herein. Computer system 200 includes one or more address/data buses 250 for communicating data, one or more processors 202 functionally coupled with bus 250 for processing data and executing instructions, non-volatile memory 204A (e.g., read-only memory, or ROM) coupled with bus 250 for storing static data and instructions for processor(s) 202, and volatile memory 204B (e.g., random access memory, or RAM) coupled with bus 250 for storing data and executable instructions for processor(s) 202. Computer system 200 may also include one or more system interfaces (not shown), and a changeable, non-volatile memory 204C (e.g., flash memory, EPROM, and the like) for storing data and/or firmware instructions for processor(s) 202 that can be replaced and/or updated after the manufacture of the computer system.

Computer system 200 may also include one or more input devices 210 and one or more display devices 220 that are coupled to processor(s) 202 over bus 250. Input device(s) 210 may include an alphanumeric input device (e.g., such as a touch-sensitive or typewriter-style keyboard), a pointing device that provides spatial input data (e.g., such as a computer mouse or equivalent device), and/or any other suitable human interface device that can communicate user commands and other user-generated information to processor(s) 202. Display device(s) 220 may include a liquid crystal display (LCD) device, cathode-ray tube (CRT) monitor, field emission device (FED, or "flat panel" CRT) device, light emitting diode (LED) display device, plasma display device, electro-luminescent display device, or any other display device suitable for creating graphic images and alphanumeric characters recognizable to the user.

Computer system 200 may also include one or more communication devices 230 and one or more data storage devices 240 that are coupled to processor(s) 202 over bus 250. Communication device(s) 230 are configured to transmit and receive data to and from other computer systems and/or computing devices. For example, communication device(s) 230 may include a USB controller and bus for communicating with USB peripheral devices, a network interface card (NIC) for communicating over wired communication networks, and/or wireless network card that can implement a variety of wireless data-transmission protocols, for example IEEE 802.11 and/or Bluetooth. Data storage device(s) 240 are configured for persistently storing data and information that is used by computer system 200 and/or by its users. Data storage devices 240 may include persistent storage media of one or more types including, but not limited to, electromagnetic disks (e.g., hard disks), optical storage disks (e.g., CD-ROMs), magneto-optical storage disks, solid-state drives, USB flash drives, and the like.

Figure 3:
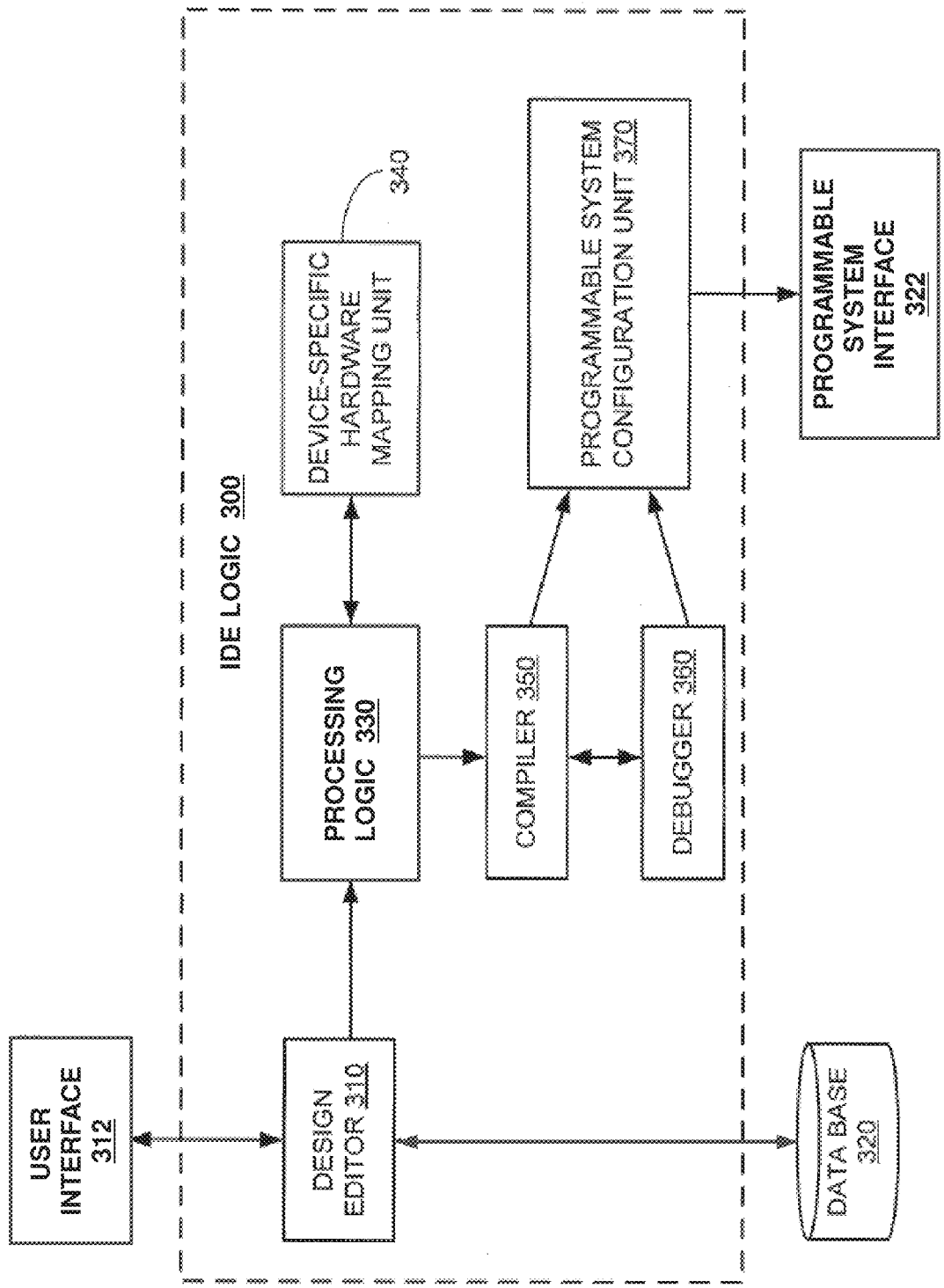
FIG. 3 is a block diagram illustrating an example integrated development environment that may be used to implement various embodiments.

FIG. 3 illustrates an example embodiment of an IDE logic (e.g., such as IDE logic 300 in FIG. 1A). Referring to FIG. 3, IDE logic 300 may be implemented as one or more modules that are stored in volatile or non-volatile memory and are executable by one or more computer systems. In some embodiments, an IDE logic may be at least partially implemented by a set of one or more discrete hardware components (not shown) in a computer system or another computing device.

In the embodiment illustrated in FIG. 3, IDE logic 300 includes design editor 310 to receive information describing hardware circuitry. The information describing hardware circuitry can be received from various sources and in various formats, for example, through user interface 312. Design editor 310 can include various development tools that present a user or system designer with options for inputting circuit designs or descriptions to IDE logic 300. For example, design editor 310 can receive code written according to a hardware description language, such as Verilog or VHDL. Design editor 310 can also provide a graphics-based circuit design application, such as a Schematic Editor, a Symbol Editor, a GPIF (General Programmable Interface) editor, etc., which allow designers and other users to create schematic diagrams of the hardware circuitry to be implemented by a programmable target device (e.g., such as programmable system 100 in FIG. 1A). In some embodiments, design editor 310 can access database 320 to determine dependencies, build rules, and debug rules for the received descriptions of the hardware circuitry.

Design editor 310 can also receive user-generated program code from user interface 312 or from other system interface. The program code can utilize at least one application programming interface generated by the IDE logic to communicate with the hardware components in a programmable target device (e.g., such as programmable system 100 in FIG. 1A). This program code can also include at least one application programming interface to allow a processor or a microcontroller in the programmable target device, when programmed with the code, to communicate with hardware components in the target device.

IDE logic 300 includes processing logic 330, which may be configured to perform various functionalities. For example, processing logic 330 may be configured to generate configuration files from the received descriptions of the hardware circuitry. In some embodiments, when the received descriptions of the hardware circuitry are in an abstracted or generic format, processing logic 330 can access a device-specific hardware mapping unit 340 to map the received descriptions of the hardware circuitry to the programmable digital and/or analog components of a programmable target device. In other words, the processing logic can determine where and how the programmable target device implements the generic circuitry provided by the user or system designer. This level of abstraction allows users without specific knowledge of the programmable target device to program and configure the target device to perform various applications through the use of generic circuit descriptions and diagrams. Processing logic 330 can also be configured to generate the configuration files from the device-specific version of the hardware circuitry descriptions.

Processing logic 330 may also generate one or more application programming interfaces from the received descriptions of the hardware circuitry. For example, an application programming interface, when provided to a programmable target device, can program one or more processors or microcontrollers to allow them to communicate with hardware components of the target device.

In example embodiments, processing logic 330 may also be configured to perform the techniques for reducing post-routing delay variance that are described herein. For instance, in some embodiments processing logic 330 is configured to perform the techniques for canonical instance ordering that are described hereinafter. In addition to, or instead of, in some embodiments processing logic 330 may be configured to perform the techniques for congestion-aware timing-driven placement that are described hereinafter. In some embodiments, processing logic 330 may further be configured to perform the techniques for timing-critical net-based routing that are also described hereinafter.

As illustrated in FIG. 3, IDE logic 300 can include a compiler 350 to compile the configuration files and/or the application programming interfaces and link them into executables that can be loaded onto a programmable target device (e.g., such as programmable system 100 in FIG. 1A). Once the configuration files and the application programming interfaces have been compiled and linked, compiler 350 can provide them to programmable system configuration unit 370 to send them to the programmable target device, for example, via a programmable system interface 322. The programmable target device can configure its programmable digital and/or analog arrays according to the configuration files and program its microcontroller according to the application programming interfaces in order to implement the hardware circuitry described by the user.

Compiler 350 can also provide the configuration files and the application programming interfaces to debugger 360 (e.g., such as debug hardware 208 in FIG. 1A). Debugger 360 can perform debugging operations on the programmable target device that is configured with the configuration files and the application programming interfaces. For example, debugger 360 can perform step over, step into, and step out operations, which allows users the ability to perform incremental evaluations that step through programming code.

Certain embodiments of the techniques for reducing post-routing delay variance described herein may be implemented as a computer program product that may include instructions stored on non-transitory computer-readable media, e.g., such as volatile storage and/or non-volatile storage. For example, a computer program product may include executable instructions that implement IDE logic 300 and/or processing logic 330, as described above with respect to FIG. 3. These instructions may be used to program one or more computing devices or computer systems that include one or more general-purpose or special-purpose processors (e.g., CPUs) or equivalents thereof (e.g., such as processing cores, processing engines, microcontrollers, and the like). When executed by the processor(s) or the equivalents thereof, the instructions cause the computing devices or computer systems to perform the operations that comprise the techniques for reducing post-routing delay variance described herein. A non-transitory computer-readable medium may also include one or more mechanisms for storing or transmitting information in a form (e.g., software, processing application, etc.) that is readable by a machine (e.g., such as a computing device or a computer system). Such non-transitory computer-readable storage medium may include, but is not limited to, electromagnetic storage medium (e.g., floppy disks, hard disks, and the like), optical storage medium (e.g., CD-ROMs and the like), magneto-optical storage medium, read-only memory (e.g., ROM and the like), random-access memory (e.g., RAM and the like), erasable programmable memory (e.g., EPROM, EEPROM, and the like), flash memory, or another now-known or later-developed type of medium that is suitable for storing information and/or executable instructions.

Additionally, some embodiments of the techniques described herein may be practiced in distributed computing environments where the computer-readable medium is stored on, and/or executed by, more than one computing device or computer system. One example of such distributed computing environment is a client-server environment where some of the various functionalities of the techniques described herein may be performed by a client computer system and/or some of the functionalities may be performed by a server computer system. Another example of such distributed computing environment is a cloud computing environment. In a cloud computing environment, computing resources are provided and delivered as a service over a network such as a local-area network (e.g., LAN) or a wide-area network (e.g., the Internet). Examples of cloud-based computing resources may include, but are not limited to: physical infrastructure resources (e.g., physical computing devices or computer systems, and virtual machines executing thereon) that are allocated on-demand to perform particular tasks and functionalities; platform infrastructure resources (e.g., an operating system or OS, programming language execution environments, database servers, web servers, and the like) that are installed/imaged onto the allocated physical infrastructure resources; and application software resources (e.g., application servers, single-tenant and multi-tenant software platforms, and the like) that are instantiated and executed in the environment provided by the platform infrastructure resources. In various distributed computing environments, the information transferred between the various computing devices and/or computer systems may either be pulled or pushed across the transmission medium connecting the computing devices and/or computer systems.

Figure 4:
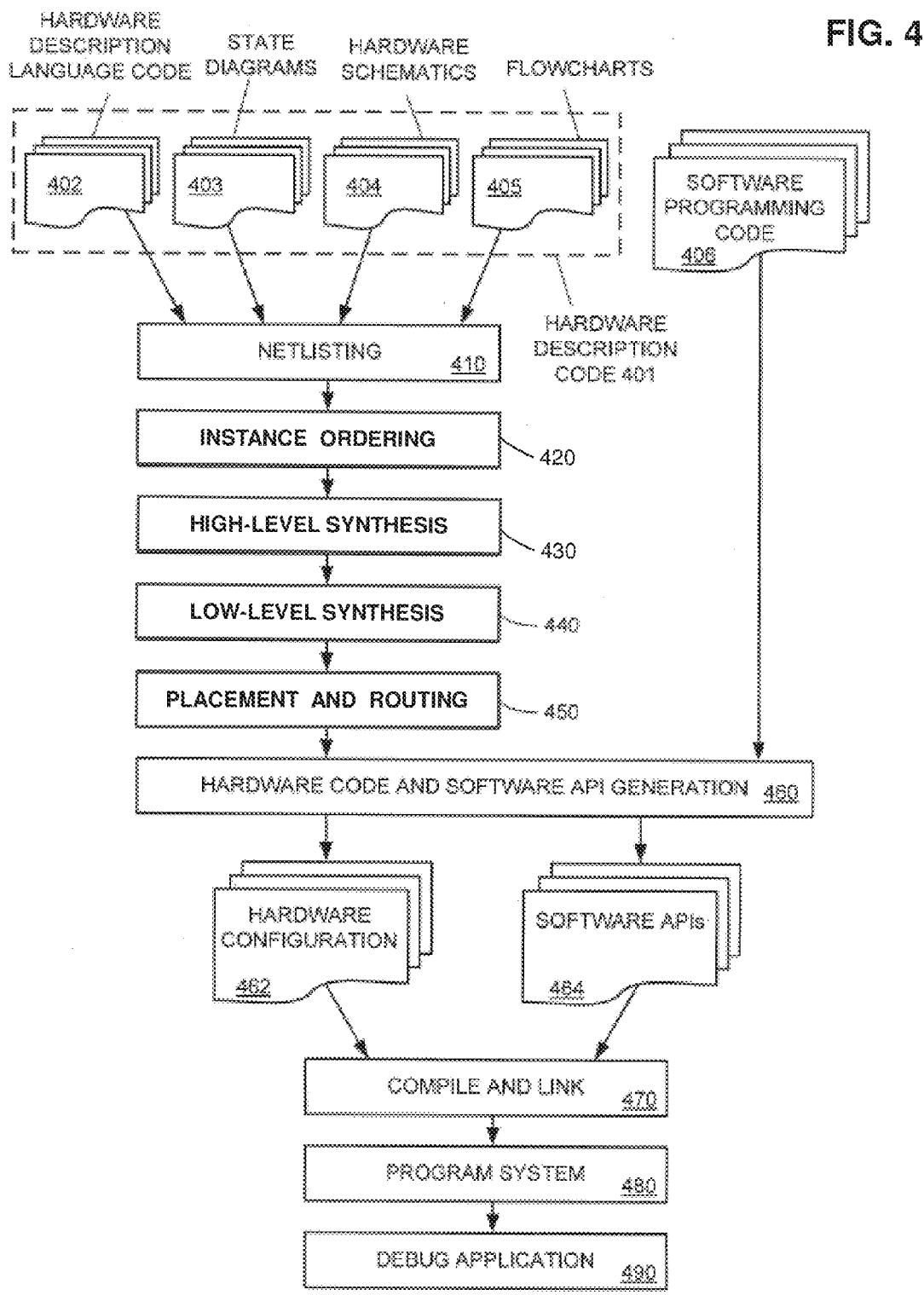
FIG. 4 illustrates a design automation flow according to an example embodiment.

FIG. 4 is a block diagram illustrating a design automation flow according to one embodiment. The various steps of the flow in FIG. 4 are described hereinafter as being performed by a processing logic, a compiler, and a debugger (e.g., such as processing logic 330, compiler 350, and debugger 360 of FIG. 3) that are executed by one or more computer systems. It is noted, however, that various implementations and embodiments may use different, and possibly multiple, components to perform the operations of the flow in FIG. 4. For example, in various embodiments such components may be implemented in a single integrated component or their functionality may be spread across two or more components that may perform some additional operations and functionalities. Thus, the description hereinafter, of the flow in FIG. 4 as being performed by a processing logic, a compiler and a debugger, is to be regarded in an illustrative rather than a restrictive sense.

Referring to FIG. 4, a processing logic receives hardware description code 401, such as hardware description language code 402, state diagrams 403, hardware schematics 404, and flowcharts 405, which describe the hardware circuitry of an electronic design. The hardware circuitry can include one or more circuits to perform various application or functions and analog and/or digital signal routing associated with the circuits. Hardware description language code 402 can be written in Verilog, VHDL, or other similar hardware description language. Hardware schematics 404 can be schematic diagrams of the hardware circuitry created with a graphics-based circuit design application, such as a Schematic Editor, a Symbol Editor, a GPIF (General Programmable Interface) editor, etc.

In block 410, the processing logic performs netlisting of hardware description language code 402, state diagrams 403, hardware schematics 404, and/or flowcharts 405, to generate a single representation (e.g., such as a netlist) of the hardware circuitry to be implemented by a programmable target device (e.g., such as programmable system 100 of FIG. 1A). For example, as part of netlisting, the processing logic can combine and integrate the circuitry descriptions, which may have various formats, into a single netlist that represents the entire hardware circuitry.

In block 420, the processing logic uses the information stored in the netlist to perform a canonical instance ordering process according to the techniques described herein. Specifically, the processing logic uses the list of instances from the initial netlist to generate a mapping to another, canonical ordering that is largely invariant to, and independent from, the instance names and their position on the original netlist order. In this manner, the processing logic ensures that when any subsequent ECO changes are made to the netlist, the subsequent canonical ordering will preserve the order of those instances that are included in both the previous netlist and the subsequent netlist. As a result, later processing (e.g., such as packing, placement and routing) that uses the netlist with the canonical ordering will be substantially invariant to minor changes in the initial netlist, thereby leading to a reduced post-routing timing delay variance. In some embodiments, the operations in block 420 may be performed after the high-level and/or low-level synthesis operations (described below in blocks 430 and 440, respectively) but before any packing or placement has been performed.

In block 430, the processing logic performs high-level synthesis on the netlist that represents hardware description code 401. As part of the high-level synthesis, the processing logic breaks down (e.g., reduces) the netlisted hardware description code into lower level primitives, logic equations, and/or flip-flops, and stores the reduced description code in (or in association with) the corresponding netlist. In block 440, the processing logic maps the reduced hardware description code in the netlist to the programmable target device through low-level synthesis. As part of the low-level synthesis flow, the processing logic: (1) determines which hardware resources or components within the programmable target device (e.g., such as programmable digital arrays and/or programmable analog arrays) can implement the circuitry components and primitives described by the reduced hardware description code in the netlist; and (2) stores in (or in association with) the netlist a mapping that associates instances representing the components and primitives with the corresponding hardware resources of the programmable target device.

After block 440, in some embodiments the processing logic may perform packing, which is a flow that groups one or more instances from the netlist into one or more structures that can then be placed into the architecture of the programmable target device. For example, the processing logic may pack into a single PLD a group instances that represent one or more equations, and may then place and route that PLD onto one or more resource elements of the architecture of the programmable target device.

In block 450, the processing logic performs placement and routing for the instances included in the netlist that represents the hardware circuitry of the electronic design. In some embodiments, the processing logic performs annealing-based placement for a programmable target device with asymmetrical architecture. For example, according to the techniques described herein, the processing logic uses congestion-ware placement costs in determining the locations, in a digital array of the programmable target device, where the various instances of the netlist are to be placed. Since according to the techniques described herein the congestion costs are accounted for in the placement costs, the annealing mechanism used by placement operation automatically accounts for any congestion that may be caused by the asymmetry of the architecture of the target device; in turn, this reduces the timing delay variance that is computed after the routing operation. In addition to performing placement for the instances of the digital components, in some embodiments the processing logic may also perform placement for the instances of the analog components included in the hardware circuitry.

After placement, in block 450 the processing logic performs routing of the placed instances. During routing, the processing logic determines routes and the corresponding switches that are needed to connect the placed instances. According to the techniques described herein, in some embodiments the processing logic determines a timing-critical priority for each net represented on the netlist, and then iteratively routes the nets based on their timing-critical priorities, where at each iteration nets with higher priorities are routed before nets with lower priorities. In this manner, the processing logic ensures that timing-critical nets are routed first, thereby reducing the timing delay variance in the final routing.

In block 460, the processing logic generates hardware configuration files 462 and application programming interfaces 464. For example, the processing logic generates hardware configuration files 462 based on the netlist of the reduced hardware description code and based on the placement and routing performed in block 450. (It is noted that in embodiments in which the programming target device has asymmetric digital array architecture, a dataset representing this architecture may also be included in the hardware configuration files 462). The processing logic generates application programming interfaces 464 based on software programming code 406 received from at least one system interface, and possibly based on the netlist of the reduced hardware description code and on the placement and routing performed in block 450. Software programming code 406 may include at least one application programming interface to allow a processor or a microcontroller in the programmable target device, when programmed with the software programming code, to communicate with hardware components in the target device.

In block 470, a compiler compiles and links application programming interfaces 464, and also compiles (and/or otherwise prepares) hardware configuration files 462 for loading to the programmable target device. In block 480, the compiler (or other logic) sends the compiled and linked hardware configuration files 462 and application programming interfaces 464 to the programmable target device. In this manner, the programmable target device (e.g., such as programmable system 100 in FIG. 1A) is configured to implement the hardware circuitry of the electronic design (e.g., that is described in hardware description language code 402, state diagrams 403, hardware schematics 404, and/or flowcharts 405) responsive to the hardware configuration files and the application programming interfaces. In block 490, a debugger may execute a debugging application to debug the programmable target device when any issues are found or when a design (or re-design) needs to be tested.

In some embodiments, the processing logic can receive an indication to initiate automatic configuration and programming of the programmable target device after receiving the input information 402, 404, and 406. The processing logic and the compiler can automatically perform operations associated with the blocks 410-480 (and possibly with block 490) in response to receiving the indication. In some embodiments, the indication can be received from a user via at least one of system interfaces.

III. Canonical Instance Ordering

Introduction

As used herein, "netlist" refers to one or more data structures that store data describing the components, connectivity, and other properties of the circuitry of an electronic design. In various embodiments and implementations, a netlist may be implemented as various types of data structures stored on volatile and/or non-volatile storage media. Examples of such data structures include, but are not limited to, files, tables, lists (e.g., structured lists, length-name-value pairs lists, and the like), data records (e.g., records stored in relational, hierarchical, or object-oriented databases), data objects instantiated from object-oriented classes, arrays, and/or any other suitable structured data arrangements that can store persistent or in-memory data.

In some embodiments, a netlist comprises a list of instances (and, possibly, other connectivity and design information such as nets, input pins, output pins, clocks, etc.) and their definitions and attributes. As used herein, "instance" refers to a data object that represents a digital component in a netlist. "Digital component" refers to a physical component that can be used in a digital circuitry to perform a certain function. Examples of digital components include, but are not limited to, logic gates (e.g., AND gates, universal gates such as NAND and NOR gates, OR gates, NOT gates, XOR gates, XNOR gates, and the like), flip-flops (e.g., SR flip-flops, D flip-flops, T flip-flops, JK flip-flops, and the like) and various other primitives (e.g., memory primitives, data and address bus primitives, port primitives, library elements such as adders, multipliers, logic equations, and the like) that may be provided by a programmable target device. In various embodiments and implementations, an instance may be implemented as a set of data, as one or more records in a database, as one or more entries on a list, as a name-value pair, as an object-oriented class instance, as a set of ordered values, and as any other suitable data object that can store or represent data; in operation, a data object may be stored on volatile and/or non-volatile media.

Engineering change orders (ECOs) for digital array designs (e.g., such as FPGA-based designs or digital block arrays in programmable systems-on-chip) often require design changes late in the design process in order to correct functional, timing, and/or technological problems. Such ECO-type changes may involve adding and/or removing instances from the circuitry netlist, or may involve changing the values of one or more attributes of one or more instances on the netlist. Typically, an ECO-type change causes a change to a small portion of the circuitry netlist. To take advantage of the enormous resources and time already spent on placement and routing flow, it is desirable to maintain post-routing delay characteristics that are the same as, or substantially similar to, to the corresponding characteristics of the pre-ECO state of the design in order to avoid further expensive design iterations. In some embodiments (e.g., such as embedded systems), it is very costly and time-consuming to perform design iterations, especially in ECO situations. (It is noted that the canonical instance ordering techniques described herein are especially applicable in ECO situations, but may not be as useful in design optimization scenarios that intentionally use variance as an advantage when exploring the entire solution space in the search for the best solution.)

For example, an ECO-type change may cause a modification of a small subset of the circuit netlist, which may result in a minor variation in the instance list order seen by a packer during the packing stage. Most packing heuristics, including fast greedy heuristics as well as relatively slower non-greedy heuristics, process the instances on the netlist in a certain order and have varying degrees of dependence on the initial instance order. Even a slight variation in this order may result in a substantially different packing and the subsequent placement and routing results may also change. In the worst case, the post-routing delay may fail timing constraints and require an expensive design iteration.

One conventional approach in addressing the challenges posed by ECO-type changes uses custom heuristics during the high-level logic synthesis in order to make the output from the synthesis stage more ECO-tolerant. Another conventional approach involves packing look-up tables (LUTs) into clusters, where the LUT packing may be performed as a sub-task within the mapping stage or as a separate task before placement is performed on the packed clusters. It is noted, however, that highly optimized packers (e.g., packing engines) and placers (e.g., placement engines) are inherently more susceptible to high variance from minor changes to the input netlist. For example, EDA tools using highly optimized placement algorithms typically produce close to minimum wire-length placements with great timing characteristics. However, due to the huge solution space on which the placers usually work, most stochastic placement algorithms have dependency on the initial starting state. Thus, any disturbance in the initial starting state can still produce vastly different placement. As a result, minor changes to the input netlist provided to a placer can result in a placement for which post-routing timing constraints may be violated, resulting in expensive design iterations.

The predictability of an EDA tool used in the design process is not unique just to ECO situations, but the success of using the tool to address an ECO-type change is highly dependent on predictability of the tool. A typical EDA tool may use several algorithms to perform design optimizations. Most design problems are NP-Hard, and there are no exact methods. Instead, heuristic approaches are employed, which return suboptimal solutions within a reasonable length of time. These heuristics lead to noise that creates variability in solution quality. This "tool noise" may be used advantageously by a designer to choose the best solution after running the tool several times, where at each run the designer can make a slight change to a source of noise (e.g., to one or more initial seeds). But the disadvantages resulting from such tool noise considerably outweigh its benefits. For example, tool noise makes the solution space less smooth, which reduces the solution quality and increases the convergence time of gradient descent algorithms. Tool noise also tends to magnify the variation in the solution quality in the event of ECO changes. Further, tool noise negatively impacts the accuracy of upfront estimators (e.g., such as a pre-routed estimation of interconnect delays to rank and cost the criticality of nets during the placement stage.)

Example Methods for Generating and Using Canonical Instance Orderings

The techniques for canonical instance ordering described herein address the disadvantages caused by EDA tool noise and improve the predictability of the EDA tool, especially in ECO situations where minor changes to a placed and/or routed design may cause an unacceptable post-routing delay when compared to the delay and/or timing of the initially placed/routed design. The techniques described herein either guarantee a unique instance order (e.g., if an ECO-type change caused a change in the initial instance order) or minimize the perturbation to the instance order as seen by a subsequent operation (e.g., at a packing stage or placement stage) from any significant ECO-induced change to the initial instance order. This helps in isolating the post-packing placement and routing flow from netlist changes and drastically reduces the variance in post-routing delay. For example, experimental results generated by the techniques described herein demonstrate zero variance against random shuffling of instances on the netlist before the packing stage (where the shuffling is used to simulate an ECO scenario). Experimental results for other non-functional or slight functional modifications to the input netlist show greatly reduced post-routing delay variance.

According to the techniques described herein, a canonical ordering process should be performed on the instances of a netlist as early as possible in the design flow, so that any ECO-induced changes would not perturb the design flow. A canonical ordering process can have one or more of the following characteristics:

1) it is independent of any string properties such as the name attributes of the instances (which attributes are very susceptible to ECO-type changes);
2) it encodes the structural fan-in and/or fan-out cones for each instance;
3) it guarantees canonical ordering up to structural equivalence of the instances;
4) for LUTs, it guarantees canonical ordering up to structural equivalence of the instances and functional equivalence of the LUTs;
5) for structurally equivalent instances, certain instance properties that are less likely to be impacted by ECO-type change are used for tie-breaking (this helps in further minimizing perturbation resulting from an ECO-type change);
6) the ordering algorithm effectively constructs and combines integer signatures to reduce aliasing probability (this helps to further reduce the post-routing variance).

In some embodiments, such canonical ordering process may be performed prior to logic synthesis (e.g., after a netlist is parsed). In other embodiments, the canonical ordering process could be employed right before packing is performed (e.g., right before the packing stage). The output of the canonical ordering process is a canonical instance ordering.

As used herein, "instance ordering" refers to a dataset that is associated with instances on a netlist, where the dataset elements represent an order of the instances on the netlist. For example, an instance ordering may comprise a sequence of data elements (e.g., such as data values), where each data element corresponds to an instance on the netlist and where the sequence of the data elements indicates the order of their associated instances on the netlist. In various embodiments, an instance ordering may be implemented in various ways including, but not limited to, as a list of data values stored in a file associated with a netlist, as a list of data values stored as an entry in the netlist, as a set of data values stored in a column of a spreadsheet or table that is stored in (or in association with) the netlist, as data fields stored in an object instantiated from an object-oriented class, and/or as any other storage structure that is suitable of representing ordered instances.

In order to achieve a stable instance ordering under ECO-type situations, given a list of instances in a netlist, in some embodiments a processing logic (which embodies a canonical ordering process) computes a mapping to a canonical instance ordering. The canonical instance ordering indicates an order that is invariant with respect to any changes to the input order of the list of instances. In other words, a mapping function applied by the processing logic produces the exact same order no matter what the input order is. If an instance is added or removed from the netlist as a result of an ECO-type change, then the canonical instance ordering generated by the processing logic should maintain the same relative order for the unchanged portion of the instances in the netlist. For such mapping function to exist, the function cannot be dependent on the instance name and the position of an instance in the initial input list of instances.

In an example embodiment, a mapping function uniquely identifies each instance based on one or more of its design attributes and/or connectivity attributes. If two instances in the netlist are in fact structurally equivalent, then their relative order in the canonical instance ordering doesn't matter from packing and placement point of view. Thus, two instances may be uniquely identified (e.g., with the same signature) if and only if they are structurally equivalent—e.g., if the two instances have the exact same instance type, fan-in cone structure, and/or fan-out cone structure. As used herein, "signature" refers to a data value that is associated with an instance and identifies the instance based on structural, connectivity, and/or design attributes of the instance. In some embodiments, a signature of an instance does not depend on a position of an instance on a netlist or on a non-structural label (e.g., such as a name) assigned to the instance.

Figure 5:
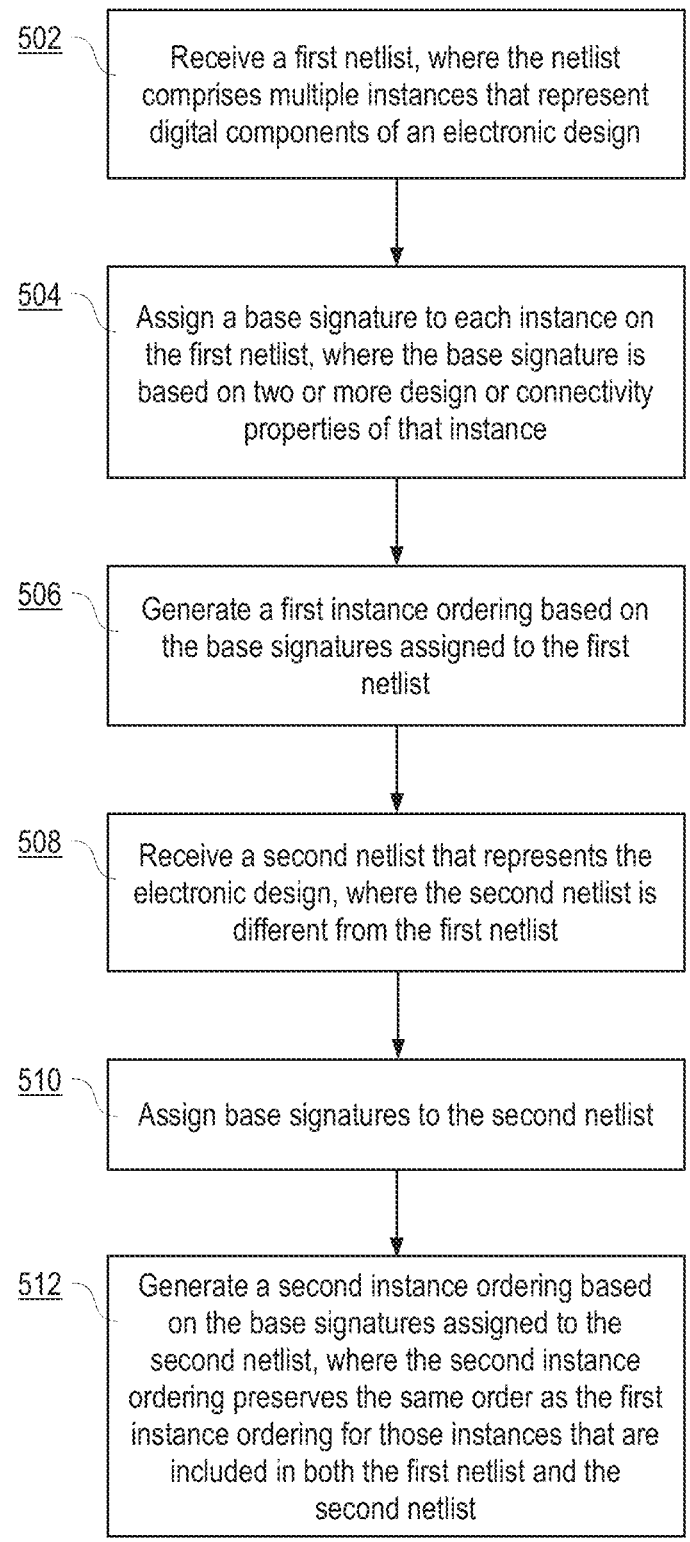
FIG. 5 is a flow diagram illustrating an example method for reducing post-routing delay variance according to one embodiment.

FIG. 5 is a flow diagram illustrating an example method for reducing post-routing delay variance by performing the techniques for canonical instance ordering described herein. The operations in the blocks of FIG. 5 are described hereinafter as being performed by a processing logic that is executed by one or more computer systems. It is noted, however, that various implementations and embodiments may use different, and possibly multiple, components to perform the method of FIG. 5. For example, in various embodiments such components may be implemented in a single integrated component or their functionality may be spread across two or more components that may perform some additional operations and functionalities. Thus, the description hereinafter of the method in FIG. 5 is to be regarded in an illustrative rather than a restrictive sense.

In block 502, a processing logic receives an initial netlist. The initial netlist comprises multiple instances that represent digital components of an electronic design. For example, in some embodiments the processing logic may be included in an EDA tool that is configured to read the netlist from a file, while in other embodiments the processing logic may be configured to receive and/or retrieve the netlist from a database or over a network. In some embodiments, the processing logic may receive the netlist from another EDA component or logic, which has performed various netlisting operations to assemble the netlist (e.g., such as netlisting of hardware description language code, state diagrams, hardware schematics, and/or flowcharts that describe the circuitry of the electronic design).

In block 504, the processing logic assigns a base signature to each instance on the initial netlist, and stores the base signature in association with the corresponding instance. The base signature for a given instance is based on two or more design attributes or connectivity attributes of that instance. For example, the processing logic may determine one or more design attributes of the instance (e.g., such as structural attributes, functional attributes, etc.) and one or more connectivity attributes of the instance (e.g., such as the names of its terminal nodes, the names of the terminal nodes of its fan-in and fan-out, etc). Then, the processing logic may generate the base signature for the instance based on two or more of the determined design and/or connectivity attributes. In various embodiments and implementations, the base signature generation for an instance may involve various operations including, but not limited to, selecting several of the design/and or connectivity attributes of the instance, concatenating the (selected) design/and or connectivity attributes, computing a digital representation (e.g., a hash) based on the design/and or connectivity attributes, and/or any other operation that can generate a suitable data value that can identify the instance based on some or all of its design and/or connectivity attributes.

In block 506, the processing logic generates an initial instance ordering for the instances on the initial netlist. For example, the processing logic may execute a canonical ordering process, based on the base signatures assigned to the instances in the netlist, to generate a canonical instance ordering. In some embodiments, generation of the canonical instance ordering may involve applying a mapping function to the base signatures. In some embodiments, generation of the canonical instance ordering may involve combining the base signatures with other structural or design information associated with the instances on the initial netlist, and then applying the mapping function to the combined information. After generation, the processing logic stores the canonical instance ordering in, or in association with, the initial netlist.

In block 508, the processing logic receives a subsequent netlist. The subsequent netlist is different from the initial netlist but represents the same electronic design. In one example embodiment, the subsequent netlist reflects an ECO-type change to the electronic design. For example, the ECO-type change may involve adding one or more digital components to the design and/or changing one or more design and/or connectivity attributes of component(s) previously included the design. Thus, the subsequent netlist may include one or more new instances representing the additional one or more digital components and/or changes to one or more design and/or connectivity attributes of instances already on the initial netlist.

In block 510, the processing logic assigns base signatures to instances on the subsequent netlist by using the same operations as the operations performed in block 504 for the initial netlist.

In block 512, the processing logic generates a subsequent instance ordering for the subsequent netlist by using the same operations as the operations performed in block 506 for the initial netlist. The subsequent instance ordering preserves the same order as the initial instance ordering for those instances that are included (e.g., without any changes) in both the initial and the subsequent netlists. For example, the processing logic may execute the same canonical ordering process, based on the base signatures assigned to the instances in the subsequent netlist, to generate the subsequent canonical instance ordering.

After the operations in block 512 are completed, the processing logic may continue with other operations in the design flow. For example, in some embodiments the processing logic may use the subsequent instance ordering in performing packing and/or placement of the design onto a particular architecture. In the packing stage, the processing logic groups one or more instances from the subsequent netlist based on their subsequent canonical instance ordering, and then passes the generated structures to the placement stage. In the placement stage, the processing logic executes an annealing-based placement process to assign the instances to locations in the architecture of a programmable target device. In one embodiment, such placement process may be a congestion-aware placement flow that places the instances of the netlist onto an asymmetrical architecture that has horizontal and vertical channels with different capacities. One example of such congestion-ware placement flow is described below in Section IV. In another embodiment, the placement process may place the instances of the netlist onto a non-asymmetrical architecture (e.g., an architecture having symmetrical horizontal and vertical channels and, optionally, one or more additional dedicated channels).

Figure 6:
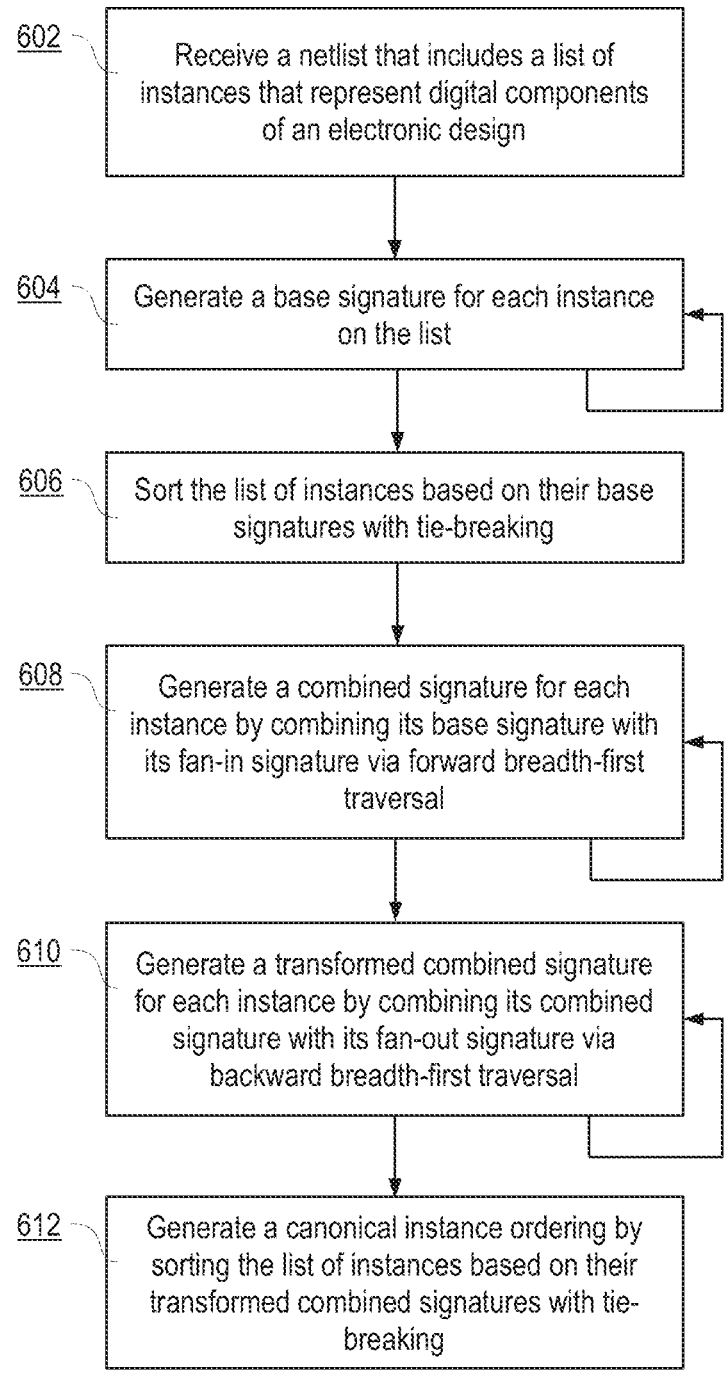
FIG. 6 is a flow diagram illustrating an example method for generating a canonical instance ordering according to one embodiment.

FIG. 6 is a flow diagram illustrating an example method for generating a canonical instance ordering for a list of instances in a netlist. The operations in the blocks of FIG. 6 are described hereinafter as being performed by a processing logic that is executed by one or more computer systems. It is noted, however, that various implementations and embodiments may use different, and possibly multiple, components to perform the method of FIG. 6. For example, in various embodiments such components may be implemented in a single integrated component or their functionality may be spread across two or more components that may perform some additional operations and functionalities. Thus, the description hereinafter of the method in FIG. 6 is to be regarded in an illustrative rather than a restrictive sense.

In block 602, a processing logic receives an initial netlist. The initial netlist includes a list of instances that represent digital components of an electronic design. For example, in some embodiments the processing logic may be configured to read the netlist from a file, while in other embodiments the processing logic may be configured to receive and/or retrieve the netlist from a database or over a network. In some embodiments, the processing logic may be configured to receive the netlist from another component or logic (e.g., a module in an IDE) that has performed various netlisting operations to assemble the netlist (e.g., such as netlisting of hardware description language code, state diagrams, hardware schematics, and/or flowcharts that describe the circuitry of the electronic design).

In block 604, the processing logic generates a base signature for each instance on the list of instances, and stores the generated base signatures in association with their corresponding instances. The base signature for a given instance is based on two or more design attributes or connectivity attributes of that instance. The design attributes of the instance may vary depending on the type of component represented by the instance and may include, without limitation, type of the instance (e.g., type of gate, type of flip-flop, etc.), number of input terminals, width (e.g., in bits) of each input terminal, number of output terminals, width (e.g., in bits) of each output terminal, string value representing an equation (if the instance represents a macro-cell), and the like. The connectivity attributes of the instance may vary depending on the type of component represented by the instance and may include, without limitation, terminal names of the instance and terminal names of the fan-in and fan-out of the instance.

In block 606, the processing logic sorts the list of instances based on their base signatures. In some embodiments, the sort operation may be performed by using one or more pre-determined heuristics (e.g., such as heuristic(s) that are specific to the architecture of the programmable target device on which the design is to be implemented). In some embodiments, the sort operation may be performed by using a tie-breaking heuristic that defines how to order two or more instances that have the same signature.

In block 608, the processing logic generates combined signature for each instance on the list of instances, and stores the generated combined signatures in association with their corresponding instances. The combined signature of an instance is generated based on the base signature and on the fan-in signature of the instance. As used herein, "fan-in" (or "fan-in cone") refers to the set of instances that can reach, directly or indirectly (through another instance), the input node(s) of an instance. The fan-in signature of a given instance is based on the base signatures of the instances in the fan-in of that instance. For example, in some embodiments the fan-in signature of an instance may be a value (e.g., a hash value, an XOR value, etc.) computed over the base signatures of the instances included in the fan-in for that instance. In some embodiments, the combined signature of an instance may be computed by traversing the fan-in of the instance in a forward breadth-first traversal and, at each node, computing the combined signature by performing an operation (e.g., hash, XOR) over the signature obtained at the previous traversal node and the base signature of the instance at the current node in the traversal.

In block 610, the processing logic generates a transformed combined signature for each instance on the list of instances, and stores the generated transformed combined signatures in association with their corresponding instances. The transformed combined signature of an instance is generated based on the combined signature and on the fan-out signature of the instance. As used herein, "fan-out" (or "fan-out cone") refers to the set of instances that can be reached, directly or indirectly (through another instance), from the output node(s) of an instance. The fan-out signature of a given instance is based on the base signatures of the instances in the fan-out of that instance. For example, in some embodiments the fan-out signature of an instance may be a value (e.g., a hash value, an XOR value, etc.) computed over the base signatures of the instances included in the fan-out for that instance. In some embodiments, the transformed combined signature of an instance may be computed by traversing the fan-out of the instance in a backward breadth-first traversal and, at each node, computing the transformed combined signature by performing an operation (e.g., hash, XOR) over the signature obtained at the previous traversal node and the base signature of the instance at the current node in the traversal.

In block 612, the processing logic generates a canonical instance ordering by sorting the list of instances based on their transformed combined signatures. In some embodiments, the sort operation may be performed by using one or more predetermined heuristics that may include, without limitations, some or all of the heuristic(s) used in block 606 and heuristic(s) that are different from the heuristic(s) used in block 606. In some embodiments, the sort operation may be performed by using a tie-breaking heuristic that defines how to order two or more instances that have the same transformed combined signature, where such tie-breaking heuristic may be the same as, or different from, the tie-breaking heuristic used in block 606.

Base Signature Generation

In an example embodiment, the first operation in the canonical ordering process is to generate a base signature. In this embodiment, the base signature for an instance is a linear combination (e.g., the output from bit-wise XOR operation) of the following:

1. type of the defining module of the instance (e.g., macro-cell, AND gate, OR gate, etc.);
2. names of the terminal nodes of the instance (e.g., inport1, inport2, outport1, etc.);
3. names of the terminal nodes to which each of the fan-in and fan-out of the instance is connected;
4. some or all of the integer properties of the instance (as used herein, "integer properties" refer to the numeric attributes of an instance other than labeling and other non-structural attributes; examples of integer properties include, but are not limited to, signal strength, skew, input terminal width in bits, and the like);
5. string value representing an equation if the instance is a macro-cell (as used herein, "macro-cell" refers to a combination of digital components that are configured to compute a function; for example, a macro-cell may implement a combinatorial function like "in1+(in2*in3)");

In one embodiment, the operation that computes the base signature is included in a hash function. The hash function converts its inputs into integers and applies linear transformations to the integer inputs in order to compute the final base signature.

After the base signature for each instance on a netlist is generated, in one embodiment a processing logic sorts the instances based on their base signatures before a breadth-first search (BFS) traversal is performed. The sort guarantees that the BFS traversal will not be dependent on an arbitrary order of instances.

In one embodiment, during the base signature sort, the processing logic uses a heuristic to perform tie-breaking for instances that have the same base signature. According this tie-breaking heuristic, the processing logic determines whether the name of an instance contains a bit-index value. (A bit-index value is typically included in a name to define a width, in bits, associated with the represented component; for example, if the instance represents a component of a bus that is 10-bits wide, then the instance name may be "iobus_10"). This heuristic is helpful in implementations where bit-index values for an instance are not stored in the instance data structure as an integer property, but can be extracted from the instance name for breaking ties between instances which are structurally identical.

Fan-in and Fan-Out Signature Generation

After the base signature sort, in one embodiment a processing logic uses the sorted instances to identify inputs and outputs. Any instance, which does not have an input that is being driven, is identified as a primary input and is added to an input list. Any instance that does not have a fan-out is identified as a primary output and is added to an output list.

In this embodiment, the processing logic initiates a forward BFS traversal from the input list to generate fan-in signatures. To generate fan-out signatures, the processing logic initiates a backward BFS traversal from the output list. At every instance visited during the traversal, the processing logic performs the following operations to encode the signature of the entire fan-in (or fan-out) for that instance while minimizing aliasing probability.

1. Generate the signature of the i-th fan-in for forward BFS traversal (or i-th fan-out for backward BFS traversal) of the current instance.
2. Rotate the fan-in (or fan-out) signature by i-bits. This further reduces aliasing probability. In the worst case, at the beginning of the traversal-based signature generation, it may be possible to have a situation where an instance and its fan-in have the same base signature and combining them without rotating the fan-in will result in an "all-zero" signature (e.g., as a result of a bit-wise XOR operation over the instance's base signature and the base signatures of its fan-in). Mutating signatures via rotation and linear combination has been proven to have an $O(\frac{1}{2}^{size\_of\_key})$ aliasing probability.
3. Update the current signature by linearly combining it with the transformed fan-in (or fan-out) signature.
4. Since the processing logic is not necessarily visiting the instances in topological order during the traversal, it is possible that some of the fan-ins may not have their base signatures updated by the time the current instance is reached. In that case, the processing logic may use whatever "weak" base signature that fan-in has at that time.
5. An additional operation can further strengthen the fan-in/fan-out signature generation at the cost of runtime computing resources. For example, the processing logic may first perform a topological sort and identify the topological order the instances. Then, the topological order position of each instance can be incorporated in the base signature of that instance.

Tie-Breaking

At the end of the signature generation flow, in one embodiment the processing logic sorts the instances again based on their combined (e.g., base, fan-in, and fan-out) signatures. If ties exist, then the processing logic may apply one or more of the following tie-breaking operations as part of a heuristic during (or after) the sort.

I. Determine whether the name of a tied instance contains a bit-index value. This heuristic is helpful in implementations where bit-index values for the instances are not stored in their instance data structures as an integer property, but can be extracted from the instance names for breaking ties between instances which are structurally identical.

II. Score the tied instances based on the integer attributes found in the instances' names. This is still safer against a minor name change since a user/designer is most likely to alter the alphanumeric characters in the instance name, while the integer attributes in the name most likely represent a connectivity-dependent positional indicator and are therefore less likely to be changed by the user. The scoring function is designed to reduce the aliasing probability to $(\frac{1}{2})^{length\text{-}of\text{-}name\text{-}string}$.

III. If the above two rules fail to break the tie for macro-cells, then perform tie-breaking in lexicographic order (since the macro-cell equations are already accounted for in their signatures). The rationale for this operation is that at this point, the macro-cells have been proven to be structurally and functionally equivalent and from placement point of view their order should not matter. Thus, the macro-cell tie can be resolved based on lexicographic order to guard against any minor and potentially non-name-change based perturbation in the input list.

In one embodiment, a tie-breaking heuristic performed after the list of instances is sorted based on the base signatures may include operations (I) and (II) above. In one embodiment, a tie-breaking heuristic performed after the list of instances is sorted based on the combined (e.g., base, fan-in, and fan-out) signatures may include operations (I), (II), and (III).

Experimental Results

Conventionally, the instances from an input netlist are sorted by name. Thus, a change to an instance name may alter the order of the instance list, but should not have any effect on post-placement delay characteristics.

To simulate the effect of instance name changes, an example embodiment was used to perform experiments in which the instances on the netlists of several circuits were shuffled randomly. The random number generator seed was specified through a command line interface in order to achieve repeatable results. A script was developed to run a placer repeatedly for each netlist, specifying a different random number seed for each run, which resulted in a different instance order. The script automatically recorded the minimum slack for each clock domain. To measure the effectiveness of the techniques for canonical instance ordering described herein, the script was run with the canonical instance ordering disabled and then with the technique enabled. The placer used in the experiments was a hybrid of Quadratic Placement followed by refinement and low temperature annealing. The timing results of these experiments are shown in Table 1 below.

TABLE 1

Comparing post routing delay variance with and without canonical ordering

| | | Variance | | |
|---|---|---|---|---|
| Netlist Test Case | Clock | Without sorter | With sorter [Randomly shuffling instances] | With sorter [Randomly changing instance names] |
| G | Clk_1 | 20% | 0% | 0% |
| H | Clk_1 | 13% | 0% | 0% |
| J | Clk_1 | 6% | 0% | 8% |
| K | Clk_1 | 13% | 0% | 17% |
| L | Clk_1 | 6% | 0% | 11% |
| M | Clk_1 | 6% | 0% | 0% |
| N | Clk_1 | 9% | 0% | 0% |
| | Clk_2 | 6% | 0% | 0% |
| | Clk_3 | 4% | 0% | 0% |
| O | Clk_1 | 7% | 0% | 0% |
| | Clk_2 | 7% | 0% | 0% |
| | Clk_3 | 3% | 0% | 0% |
| P | Clk_1 | 6% | 0% | 0% |
| Q | Clk_1 | 10% | 0% | 3% |
| | Clk_2 | 7% | 0% | 8% |
| | Clk_3 | 12% | 0% | 5% |
| | Clk_4 | 11% | 0% | 3% |
| | Clk_5 | 10% | 0% | 1% |
| | Clk_6 | 7% | 0% | 2% |

In Table 1, the "Variance" columns show the maximum percentage difference between the minimum and maximum frequency values across 10 runs. As can be seen, without canonical instance ordering, the maximum frequency varied over a range of up to 20%. With canonical instance ordering enabled, the maximum frequency was unaffected by the shuffling of the instances. For the test cases that had multiple clock domains, each clock domain is listed in a separate row of the table.

The name-based tie breaking criteria always provide a total order for the instances since the names are always unique. However, actual name changes would affect the final order of the instances. The last column of Table 1 shows the results without name-based tie-breaking. A few of the test circuits used in the experiment exhibit order variation, but many of them still have zero variance. As can be seen, a slightly larger variance is observed for a couple of cases as part of the random name change based experiments. This is due to router induced effects where the unsorted version may just chance upon a good "greedy" ordering which suits the router better. But for majority of cases, the results in Table 1 show that the sorted version has "0" variance.

Alternative Embodiments

Various alternative embodiments are contemplated to be within the spirit and scope of the techniques for canonical instance ordering described herein.

For example, various embodiments may use different operations to combine base signatures with fan-in and/or fan-out signatures. Such operations may include, without limitation, XOR-based operations, hash-based operations, various combinations of bit-wise operations, and any other operations that can generate unique output values based on multiple input values.

In another example, some embodiments may compute a topological order for the input list of instances, and may then use the topological order ID of each instance when generating its signature.

In another example, various embodiments may use different combinations of design attributes and connectivity attributes in computing the base signatures for the instances on a given netlist. In some embodiments, such combinations may be determined based on the specific characteristics and properties of the programmable target device, of the specific properties of the electronic design being implemented, and/or on any other properties that are specific to the particular application of the target device and/or the design that is to be implemented thereon.

In another example, various embodiments may use just the fan-in signatures or just the fan-out signatures when computing the combined signatures based on which a canonical instance ordering for a netlist is generated.

In another example, various embodiments may use different tie-breaking heuristics that may be specific to the particular application of the programmable target device and/or of the electronic design that is to be implemented thereon.

IV. Congestion-Aware Timing-Driven Placement

Introduction

Digital block arrays (e.g., such FPGAs) are continually hard-pressed to accommodate the requirements of large, complex electronic designs. Typically, the area of a digital block array is dominated by the routing resources, which may consume up to 80-90% of the total area. Thus, a good placement ensures that the routing resources of a target digital block array are efficiently utilized, and once a design is mapped to a digital block array and timing constraints are met, minor ECO-type changes should not cause timing failures.

The routability and timing predictability of a design mapped to a digital block array depends on the underlying architecture, on the placement solution, as well as on the complexity of the interconnections of the circuit(s) included in the design. However, routability and area efficiency are two competing constraints. Thus, to improve both the routability and the timing predictability, the routing and placement flows have to account for both congestion and timing constraints. Conventional congestion methods (e.g., such as linear congestion algorithms), however, do not scale well for asymmetric architectures where the routing resources are distributed differently and un-equally along the vertical and horizontal directions.

To address these issues, the techniques for congestion-aware placement described herein provide methods that account for any asymmetry in the targeted architecture by computing congestion-aware placement costs that are used by the placement flow that assigns component instances to control logic blocks in a digital block array. The techniques described herein show significant improvement in predictability of the post-routing timing via reduced variance in ECO-type scenarios.

Asymmetrical Architectures

As used herein, "control logic block" refers to a digital block that can be programmed to perform one or more functions. In some embodiments, a control logic block comprises programmable resources that include, without limitation, one or more PLDs, one or more data paths, and one or more registers. In some embodiments, the programmable resources of a control logic block may have independently selectable clocks and registers, and may be allocated and/or programmed independently to perform one or more (possibly unrelated) functions. The functions that can be mapped onto a control logic block include, without limitation, timers, decoders, sequencers, pulse-width modulators, UARTs, and various other digital functions that can be performed by one or more digital blocks.

As used herein, "architecture" refers to a dataset representing an organization of components included in a device (e.g., such as a chip), where the components include at least an array of control logic blocks coupled over communication channels. An example of an architecture is the organization of an FPGA, PLD, CPLD, or any other chip that provides digital blocks and connectivity there-between. As used herein "asymmetrical architecture" refers to an architecture in which one set of channels have a different capacity than another set of channels. "Channel" refers to a connection that a signal can take to propagate from one location in the architecture to another; a channel may have multiple sub-channels (e.g., traces or routes) so that multiple signals can be propagated through the channel simultaneously and/or in parallel.

One example of an asymmetrical architecture is an architecture in which the horizontal (H) channels have a different number of sub-channels than the vertical (V) channels; functionally, this difference in capacity indicates that the H channels can simultaneously (and/or in parallel) carry a different number of signals than the V channels. In some embodiments, the H and V channels may be included as part of a routing fabric that is programmable. It is noted that the designations of "horizontal" ("H") and "vertical" ("V") are used throughout herein for illustration purposes only and do not necessarily indicate a positional orientation of a channel.

In another example, an asymmetrical architecture may include H channels and V channels that are of the same type but have different capacities. By way of illustration, in this architecture both the H channels and the V channels may be data channels configured to carry data, where each of the H channels has one capacity (e.g., a number of sub-channels) and each of the V channels have a different capacity (e.g., a different number of sub-channels). Similarly, both the H channels and the V channels may be address channels configured to carry address data, where the H channels have one capacity and the V channels have a different capacity. It is noted that in some embodiments an architecture may not necessarily be asymmetrical just because the architecture may provide one or more dedicated channels each having a different and unique type. For example, an architecture would not be asymmetrical if it provides one dedicated channel having one capacity and a set of ordinary H and V channels that each have the same capacity. To put it differently, in these embodiments the asymmetry would need to be found between sets of channels that have the same type and/or perform the same function.

In another example, an asymmetrical architecture may be expressed in terms of the ratio between the capacity of the H channels and the capacity of the V channels. For example, such asymmetrical architecture may have an H-to-V capacity ratio of 3:1. More generally, an asymmetrical architecture may have an H-to-V capacity ratio that is in the range between 2:1 and 5:1.

In some embodiments, a device having an asymmetric architecture may be programmable. Examples of such devices include, but are not limited to, PLDs, CPLDs, programmable systems-on-chip, and any other device that includes a digital block array and switches/bridges that can be programmatically controlled by a processor/microcontroller. One example of such programmable system-on-chip is a device from the Programmable System-on-Chip (PSoC™) family of products offered by Cypress Semiconductor Corporation of San Jose, Calif.

In various embodiments, the asymmetry of an architecture may be based on one or more of the following factors:
1. The design properties (e.g., type of programmable logic, data path units, and type of fixed function blocks) of the individual digital blocks in the array.
2. The location of the digital block array (e.g., such as an FPGA) in a programmable system-on-chip.
3. The IO requirements and the distribution of the coordinates of the IO ports in the device.
4. The timing constraints on the interconnects between the different logic blocks in the array.

In some embodiments, the techniques for congestion-aware placement described herein provide for a placement flow that uses a simulated annealing-based placement algorithm with an improved cost function that is adapted to model any asymmetry of the underlying architecture. In some embodiments, the techniques described herein provide for estimating the routability of a placement solution, which is useful in characterizing the correlation between the timing of the post-placement solution and the timing of post-routing solution, thereby improving predictability. In one embodiment, the techniques described herein may be implemented to place and route a design onto a device from the PSoC™ family of products offered by Cypress Semiconductor Corporation of San Jose, Calif. In this embodiment, the devices includes a digital array of UDB blocks such as, for example, the digital array described heretofore with respect to FIG. 1B.

Figure 7:
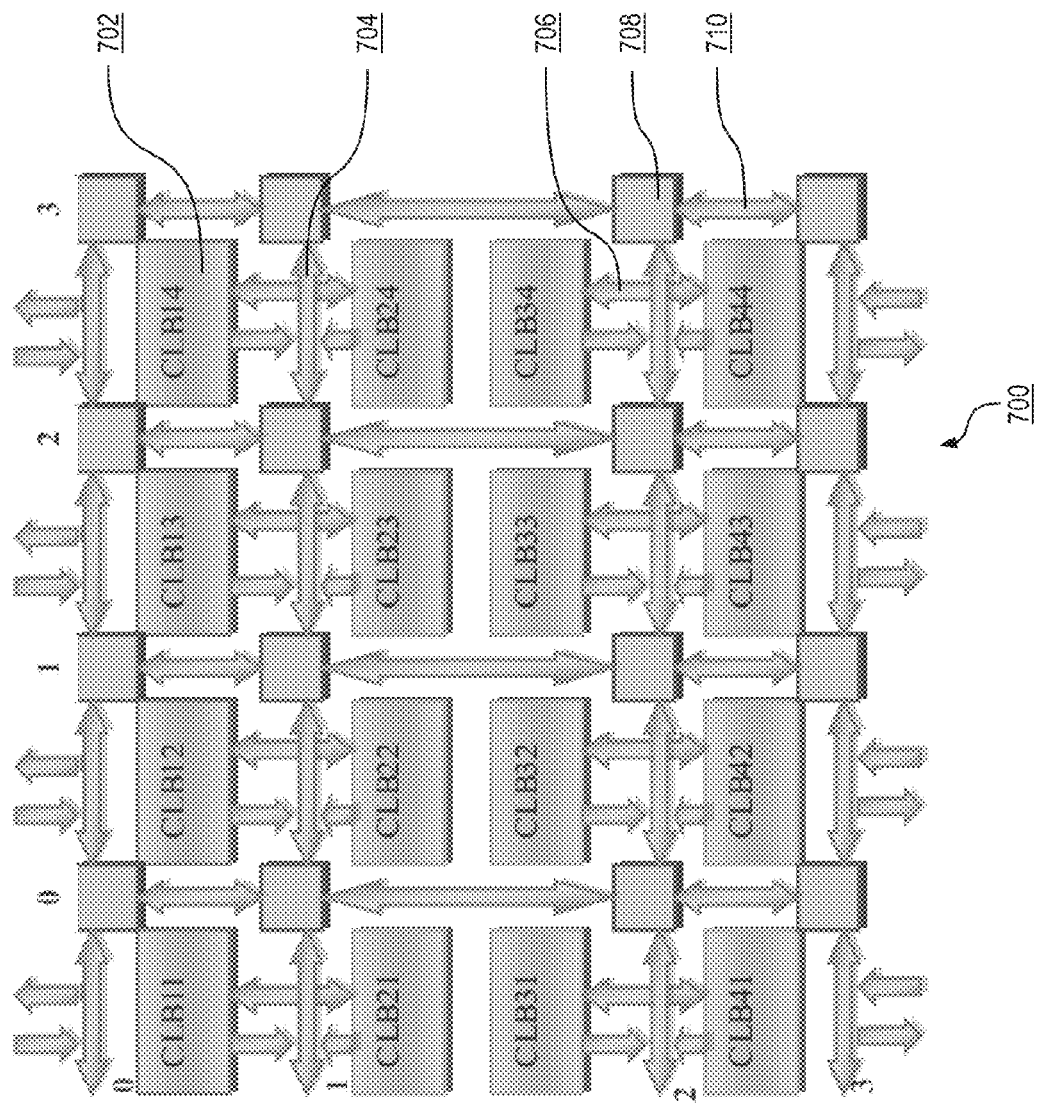
FIG. 7 is a block diagram illustrating an asymmetrical architecture according to an example embodiment.

FIG. 7 is a block diagram illustrating an asymmetrical architecture according to one embodiment. The diagram illustrates one bank (700) from an array of control logic blocks (CLBs). Bank 700 includes CLBs 702, horizontal (H) channels 704, inter-block channels 706, horizontal-to-vertical (HV) switches 708, and vertical (V) channels 710. Each horizontal channel 704 is coupled over four HV switches 708 that are in the same row, and each vertical channel 710 is coupled over four two HV switches 708. Each CLB 702 is coupled to one other CLB 702 via inter-block channel 706. The IOs of each CLB are coupled to the H channels and the V channels via a digital signal interface (not shown).

In the asymmetrical architecture illustrated in FIG. 7, the H channels 704 have 3 times the capacity of the V channels 710. For example, the H channels have 96 sub-channels, while the V channels have 32 sub-channels. Thus, each of the H channels can carry 96 signals simultaneously and/or in parallel, while each of the V channels can carry 32 signals simultaneously and/or in parallel. As illustrated in FIG. 7, in this asymmetrical architecture there are no horizontal channels in the middle section of bank 700.

In the asymmetrical architecture of FIG. 7, each CLB pair is tightly coupled and can communicate with the other CLB in the pair directly via a V channel. Each CLB in a pair is also coupled to a horizontal channel and thus can communicate with any other CLB through one or more HV switches that are programmed appropriately. In this asymmetrical architecture, it is considerably harder for CLBs that are not part of the same pair to communicate with each other.

Example Methods for Congestion-Aware Placement

The techniques described herein provide a congestion-aware timing-driven placement flow that constructs a congestion cost function and integrates it with a simulated annealing flow. The cost function effectively accounts for the asymmetry of the underlying architecture without any significant impact on the delay penalty.

As used herein, "annealing" (or "annealing flow") refers to a process performed as part of placement that searches a solution space to find a desirable placement. The solution space may include a large number of states, where each state is data indicating a unique combination of CLB locations onto which the components of an electronic design are mapped. The solution space may be very large since there may be a large number of states for placement based on the number and types of CLB locations and the number and types of instances representing digital components of an electronic design.

In some embodiments, the annealing flow starts with a random solution and then uses a schedule to move components instances, thereby traversing different states in the search for a better placement. A "move" is a transition from one state, having a certain mapping of component instances to CLB locations, to another state having a different mapping. The annealing flow may perform moves according to a "schedule", which is data that defines the starting state of the moves and the allowable states to which the moves can transition. For example, a schedule may specify the input for a move (e.g., the original CLB location of one or more component instances) and one or more target states that the move can transition to (e.g., one or more different CLB locations to which the one or more components can be mapped). In some embodiments, an annealing flow may perform its moves iteratively and use a "temperature" indicator to indicate the level of movement that is available at each iteration.

Figure 8:
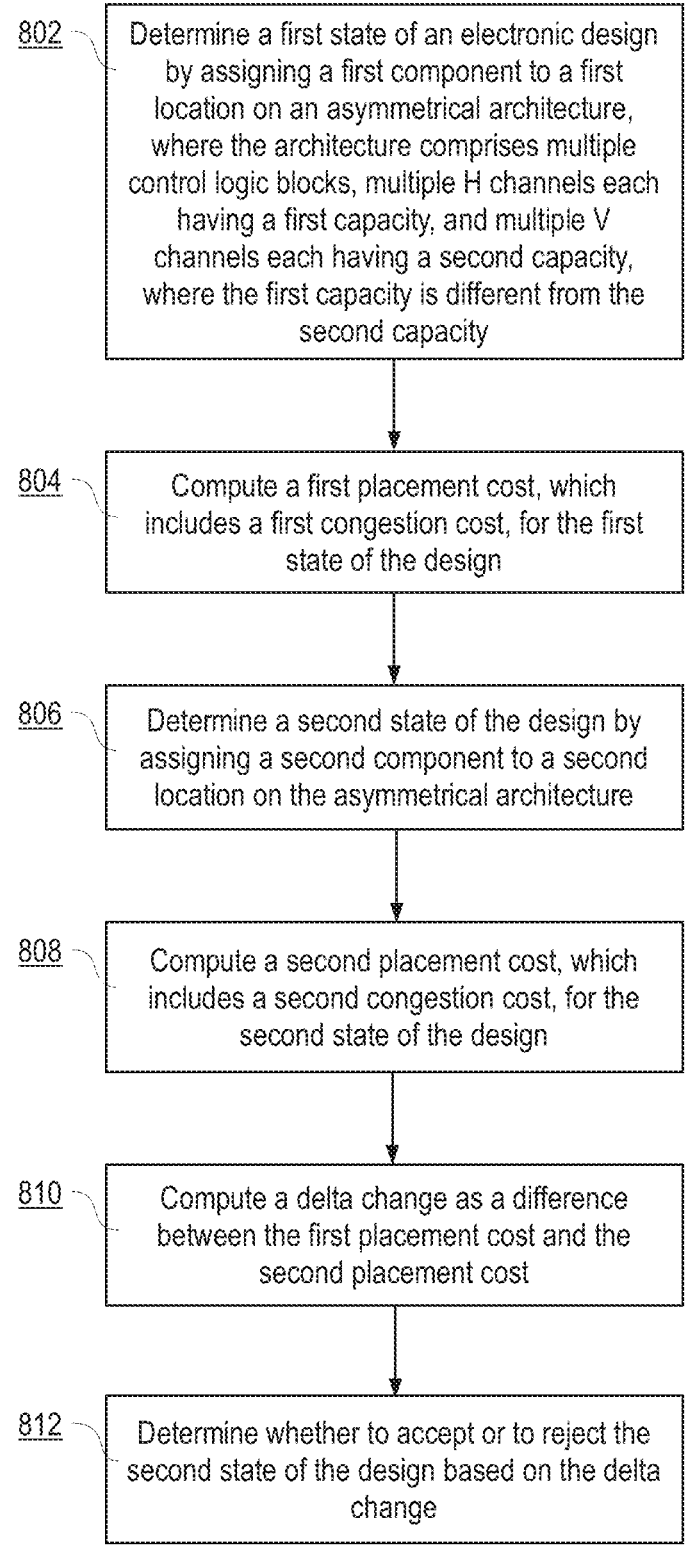
FIG. 8 is a flow diagram illustrating an example method of congestion-ware annealing-based placement of an electronic design, according to one embodiment.

FIG. 8 is a flow diagram illustrating an example method of congestion-ware annealing-based placement of an electronic design. The operations in the blocks of FIG. 8 are described hereinafter as being performed by a processing logic that is executed by one or more computer systems. It is noted, however, that various implementations and embodiments may use different, and possibly multiple, components to perform the method of FIG. 8. For example, in various embodiments such components may be implemented in a single integrated component or their functionality may be spread across two or more components that may perform some additional operations and functionalities. Thus, the description hereinafter of the method in FIG. 8 is to be regarded in an illustrative rather than a restrictive sense.

In block 802, a processing logic determines a first state of an electronic design by assigning a first instance (representing a first component) to a first location on an asymmetrical architecture. The asymmetrical architecture comprises a digital array of multiple control logic blocks, multiple H channels each having a first capacity, and multiple V channels each having a second capacity that is different from the first capacity.

For example, the processing logic may receive, retrieve, and/or access the first state, where the first state may be a set of data elements that collectively define a mapping of the component instances to CLB locations in the digital array. In various embodiments and implementations, a state may be implemented as a set of data elements stored in various types of data structures on volatile and/or non-volatile storage media. Examples of such data structures include, but are not limited to, files, tables, lists, data records (e.g., records stored in relational, hierarchical, or object-oriented databases), data objects instantiated from object-oriented classes, arrays, and/or any other suitable structured data arrangements that can store persistent or in-memory data.

In block 804, the processing logic computes a first placement cost for the first state of the design. The first placement cost indicates how the resources of the digital block array are allocated and utilized in the first state. In addition, according to the techniques described herein, the placement cost includes a congestion cost that indicates the contention for the allocated resources in the first state.

In block 806, the processing logic determines a second state of the electronic design by assigning a second instance (representing a second component) to a second location on an asymmetrical architecture. For example, the processing logic may use a schedule to select a move to, and generate, the target (second) state in which one or more instances representing one or more components are placed in locations that are different from their locations in the first state. The second state may be a set of data elements that collectively define a different mapping of the component instances to CLB locations in the digital array, and the processing logic may store such data elements in suitable data structures on volatile and/or non-volatile storage media.

In block 808, the processing logic computes a second placement cost for the second state of the design. The second placement cost indicates how the resources of the digital block array are allocated and utilized in the second state. In addition, according to the techniques described herein, the placement cost includes a congestion cost that indicates the contention for the allocated resources in the second state.

In block 810, the processing logic computes a delta change as the difference between the first placement cost (for the first state of the design) and the second placement cost (for the second state of the design).

In block 812, the processing logic uses the delta change to determine whether to accept or to reject the second state of the design. Since the delta change is based on the placement costs of the two states (before the move and after the move) that include congestion costs, the delta change accounts for any congestion that may be caused by the asymmetry of the architecture onto which the electronic design is being placed. In some embodiments, the processing logic may use the delta change to compute a probability that indicates the chances that the move to the second state would result in an acceptable solution. If the computed probability indicates a better chance of reaching an acceptable solution, the processing logic accepts the second state of the design with certain probability and continue the flow by using the schedule to determine the next move(s). Otherwise, the processing logic rejects the second state of the design and returns to the first state, and then (iteratively) explores one or more other states. In some embodiments, the probability that defines whether a state is accepted or rejected may be computed by using a function that uses as input the delta change for the state and one or more parameters that may be specified in (or determined from) a schedule that defines the "temperature" indicator associated with the allowable moves at that stage of the annealing flow.

In some embodiments the method of FIG. 8 may be repeated to search the entire placement solution space, while in other embodiments the method may be used on a subset of the solution space and/or in conjunction with other types of annealing flows. After placement flow is completed and a final state of the design is accepted, in some embodiments a processing logic may perform a routing flow. A routing flow is a process that assigns connectivity resources (e.g., channels, switches, etc.) that connect the component instances of the design.

Placement Costs and Congestion Costs

The techniques for congestion-aware placement described herein enhance the placement cost function used in the simulated annealing to factor in congestion in a way that accounts for the asymmetry of the architecture and can reduce the variance of the final post-placement and post-routing solutions.

In one embodiment, the placement cost function used in the annealing flow has two components—timing cost (TC) and bounding box cost (BC) and the objective is to minimize a linear combination of these costs. The simplified placement cost (PC) after every move during annealing can be expressed as:

$$PC = C_1 * TC + C_2 * BC$$

In this embodiment, the congestion cost (CC) is factored in the above placement cost function. The delay part in the timing cost (TC) should not be impacted directly; rather, any impact on the delay should be $2^{nd}$ order effect from the overall cost function and the choice of move. Thus, the congestion cost (CC) is factored in the bounding box cost (BC) part of the placement cost function by accounting for overlap of resource usage.

The bounding box of a multi-terminal net is the rectangular box that contains all its terminals. As used herein, "net" refers to the path of connections that a signal traverses from one location on the digital block array to another location. (By way of illustration, a net may represent the connections that comprise a circuit). The horizontal and vertical channels that fall within the bounding box are the resources used by that specific bounding box. When bounding boxes of multiple nets overlap they compete for the same channel resources. This causes congestion.

According to the techniques described herein, the channels in a congested region of the digital block array are assigned overlap penalties so that during move selection as part of annealing, the congested channels are less likely to be used. Further, unlike some conventional approaches, the overlap penalties cannot be assigned to the CLBs because of the non-uniformity of the resources in the asymmetrical architecture; thus, the overlap penalties should be dealt with at the channel level.

In one embodiment, the congestion cost (CC) should have some or all of the following properties:
1. CC>=1 always.
2. CC=1 for completely uniform placement (i.e., no overlap of bounding boxes of the nets or uniform usage of all the channel resources).
3. If CC=0, it is ignored (this represents a degenerate case).
4. CC of a non-uniform placement should be greater than the CC of a uniform placement.
5. In some embodiments, CC may also depend on the size of the annealing window (e.g., the CC value should be greater at the beginning of annealing since there is more freedom of movement at the beginning). With a smaller annealing window, since the radius of movement is reduced, the CC value should be scaled down as well.

Accounting for Asymmetry

In some embodiments, the techniques for congestion-aware placement described herein are implemented for an asymmetrical architecture. Since in an asymmetrical architecture the horizontal and vertical channel capacities are different, the congestion cost for the horizontal and vertical channels are computed separately and then combined. This differs from symmetric architectures where the horizontal and vertical channel capacities are the same and they contribute equally to the cost function.

To illustrate how the architecture asymmetry may be accounted for in the placement cost, suppose that in one embodiment $N_h$ denotes the number of horizontal channels and $H_{i,j}$ denotes the horizontal overlap penalty (e.g., the number of nets whose bounding boxes include the (i,j)-th horizontal channel segment). Then, the horizontal congestion cost can be computed as follows:

$$CC_h = (N_h * (\Sigma(H_{i,j})^2 / (\Sigma(H_{i,j})^2))^k$$

Similarly, suppose that $N_v$ denotes the number of vertical channels and $V_{i,j}$ denotes the vertical overlap penalty (e.g., the number of nets whose bounding boxes include the (i,j)-th vertical channel segment). Then, the vertical congestion cost can be computed as follows:

$$CC_v = (N_v * (\Sigma(V_{i,j})^2 / (\Sigma(V_{i,j})^2))^k$$

In the above equations, the resources are the horizontal and vertical channels and their numbering (e.g., FIG. 7 illustrates the numbering of "0" to "3" for the horizontal channels 704 and the numbering of "0" to "3" for the vertical channels 710). The exponent k in the above equations is a function of the annealing window size.

The computed congestion cost can then be factored in the total placement cost as follows:

$$PC = C_1 * TC + C_2 * CC * BC$$

where CC denotes the congestion coefficient corresponding to the placement before (or after) the annealing move. For every move during placement, the change in placement cost can be computed based on the placement cost before the move and the placement cost after the move. For example, suppose that $PC_1$ denotes the placement cost for the design state before a move and that $PC_2$ denotes the placement cost for the design state after the move. Then, $$PC_1 = C_1 * TC_1 + C_2 * CC_1 * BC_1$$

$$PC_2 = C_1 * TC_2 + C_2 * CC_2 * BC_2$$

where $$CC_1 = \left(\frac{a}{a+b}\right) * CC_h^{pc1} + \left(\frac{b}{a+b}\right) * CC_v^{pc1}$$

$$CC_2 = \left(\frac{a}{a+b}\right) * CC_h^{pc2} + \left(\frac{b}{a+b}\right) * CC_v^{pc2}$$

in which the ratio of horizontal channel capacity to vertical channel capacity is a:b. In the above equations, $CC_1$ is the congestion coefficient corresponding to the placement before the move and $CC_2$ is the congestion coefficient corresponding to the placement after the move.

After the placements costs are computed as described above, the delta change between the placement cost before a move and the placement cost after the move can be computed as follows:

$$DELTA\_CHANGE = PC_2 - PC_1$$

In this manner, the DELTA_CHANGE implicitly takes into account the congestion differences for the two different design states (i.e., the states of placement) before and after a move during annealing.

Two examples of computing global congestion costs are illustrated below with respect to FIGS. 9A and 9B.

Figure 9A:
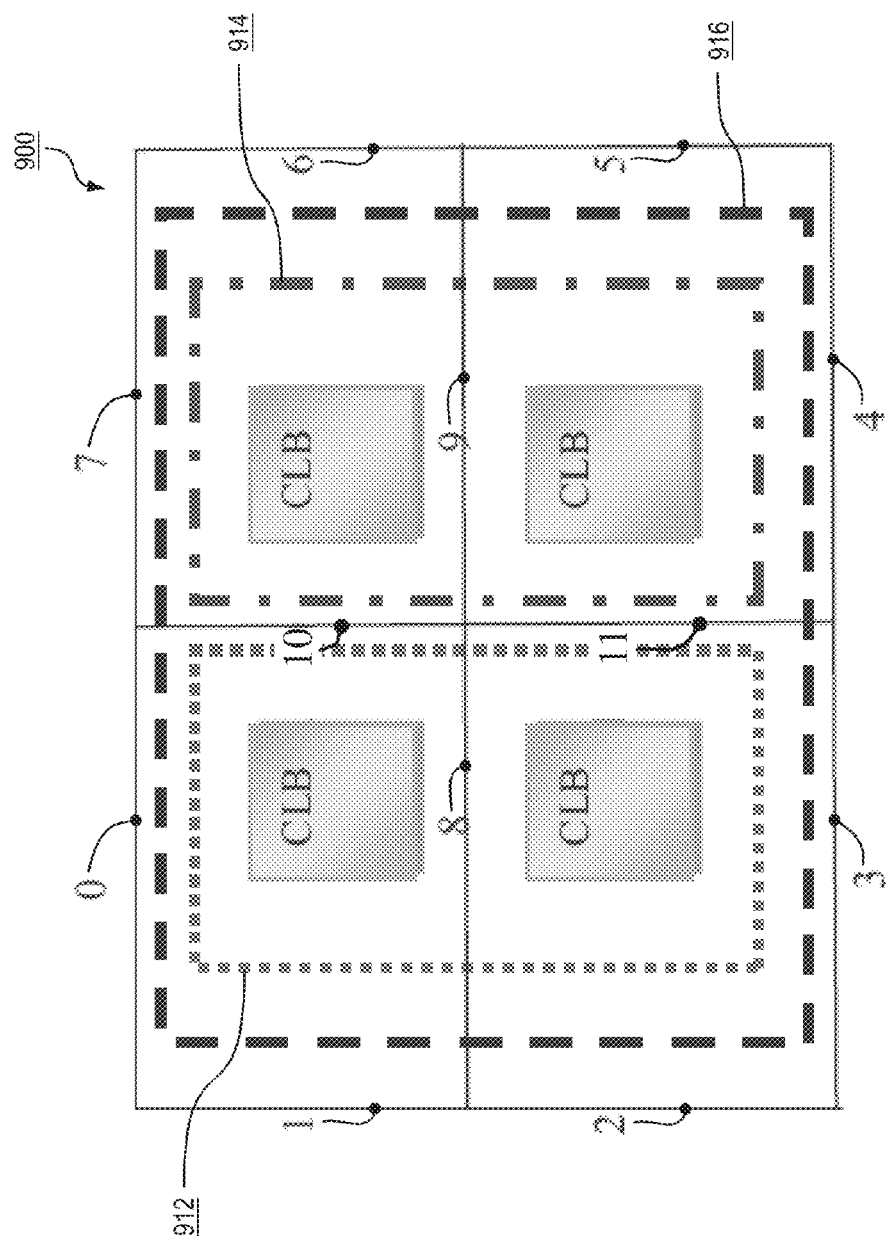
FIG. 9A is block diagram of nets used in one example of computing a global congestion cost according to one embodiment.

FIG. 9A illustrates a portion 900 of a bank that includes four CLBs and 12 channels segments (numbered "0" to "11"). Of the 12 channel segments, six are horizontal channels segments and six are vertical channel segments. Bounding boxes 912, 914, and 916 illustrate three nets that are formed over the CLBs of bank portion 900. Based on the principles of the equations above, an example congestion cost can be computed as follows (in sequence of the numbering of the channel segments):

$$CC = \frac{12*(2^2+2^2+2^2+2^2+2^2+2^2+2^2+2^2+2^2+2^2+3^2+3^2)}{(2+2+2+2+2+2+2+2+2+2+3+3)^2} \rightarrow 1.02$$

Figure 9B:
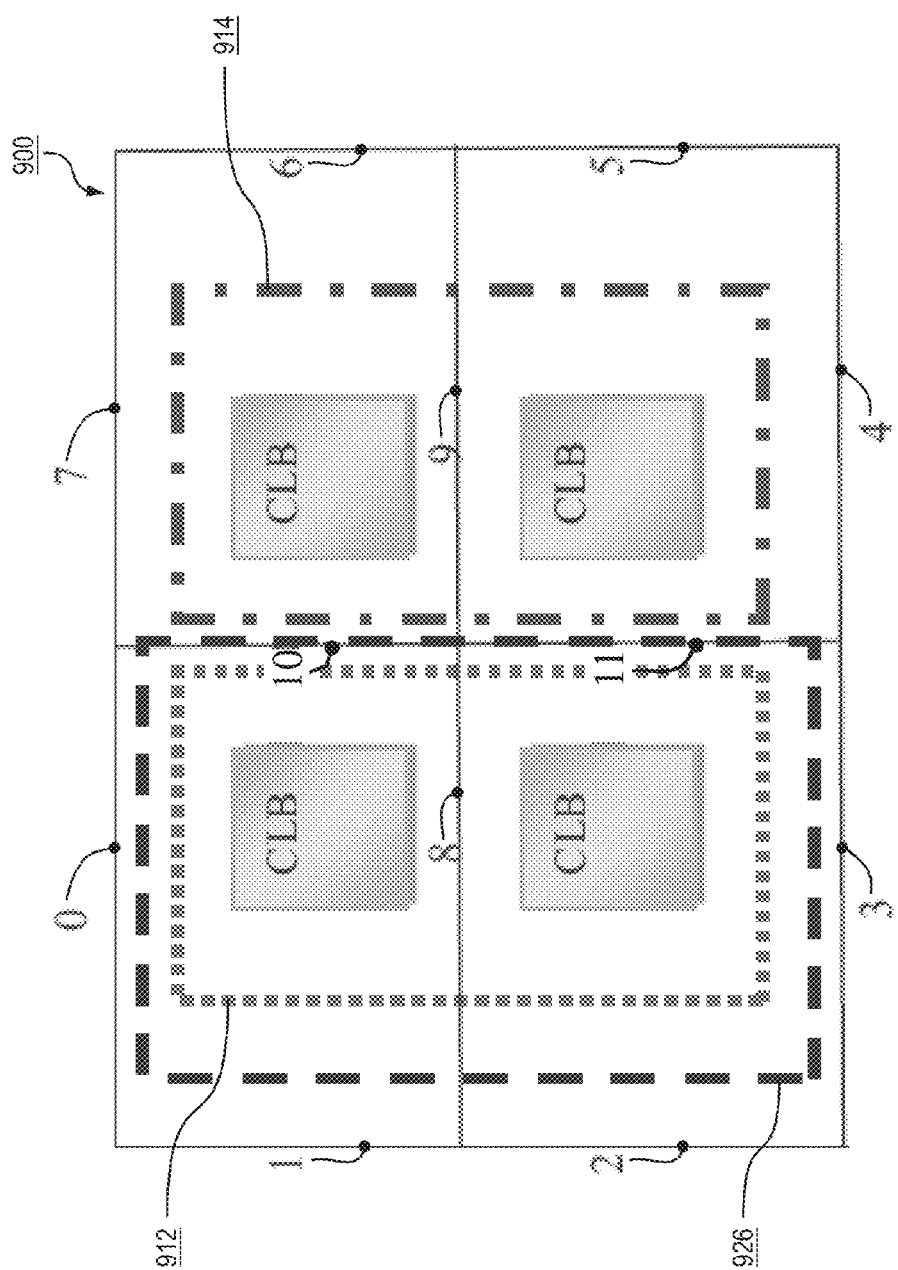
FIG. 9B is block diagram of nets used in another example of computing a global congestion cost according to an example embodiment.

FIG. 9B illustrates the same bank portion 900, except that bounding box 926 illustrates one net that is different from the net illustrated by bounding box 916 in FIG. 9A. (The other two bounding boxes 912 and 914 in FIG. 9B illustrate the same two corresponding nets as in FIG. 9A). Similarly to FIG. 9A, in FIG. 9B bank portion 900 includes four CLBs and 12 channels segments (numbered "0" to "11"); of the 12 channel segments, six are horizontal channels segments and six are vertical channel segments. Based on the principles of the equations above, an example congestion cost can be computed as follows (in sequence of the numbering of the channel segments):

$$CC = \frac{12*(2^2+2^2+2^2+2^2+1^2+1^2+1^2+1^2+2^2+2^2+3^2+3^2)}{(2+2+2+2+1+1+1+1+2+2+3+3)^2} \rightarrow 1.14$$

As illustrated by the above examples, the placement corresponding to FIG. 9A is more uniform and hence it has a lower congestion cost.

Congestion Cost Threshold Heuristic

In order to keep the post-placement variance to a minimum and not let the congestion factor dominate in the beginning of annealing, in some embodiments a threshold may be introduced on the value of the congestion cost. For example, the congestion cost may be factored in when its value is higher than the threshold. In another example, while combining the horizontal congestion cost (e.g., $CC_h$) and the vertical congestion cost (e.g., $CC_v$), the vertical congestion cost may be given higher weight when the vertical channel capacity is less than (e.g., such as $\frac{1}{3}^{rd}$ of) the horizontal channel capacity. An example heuristic is defined in Table 2 below.

TABLE 2

Example Heuristic
Example Heuristic
(for asymmetric architecture with
horizontal-to-vertical capacity ratio of 3:1)

```
If (CC_h <= 1) {
  Do not factor in congestion (reset overall CC to 1).
}
If (CC_h > 1) {
  If (CC_v == 1) {
    If (CC_h is in the range to <1 to 1.04>) {
      then don't factor in congestion (reset overall CC to 1))
    }
```

TABLE 2-continued

Example Heuristic
Example Heuristic
(for asymmetric architecture with
horizontal-to-vertical capacity ratio of 3:1)

```
  }
  If (CC_v > 1) {
    If (CC_h is in the range to <1 to 1.06>) {
      then don't factor in congestion (reset overall CC to 1))
    }
    else if (CC_h > 1.06) {
      CC = I_1*CC_h + I_2*CC_v, where (I_1 = ¼) and ((I_2 = ¾))
    }
  }
}
```

Coarse-Grained Approach (Global Congestion Cost)

In some embodiments, the congestion cost that is factored in the placement cost may be a global congestion cost. In these embodiments, a coarse-grained approach may be used when computing the congestion cost.

According to an example of the coarse-grained approach, in one embodiment the congestion cost may be computed across all the nets identified at given state of the design. In this embodiment, the overlap penalties for the channel resources are computed for all the nets and then a single horizontal congestion cost $CC_h$ (over all nets) and a single vertical congestion cost $CC_v$ (over all nets) are computed. These two congestion costs are then applied while computing placement cost for a move.

One consequence of this approach is that a local congestion in one area of the digital block array may affect moves in other "non-congested" areas of the array. In turn, this may unnecessarily de-rate the "timing characteristics" of the chip. However, this consequence can be improved significantly by restricting the congestion cost computation to the perturbation bounding box only. The perturbation bounding box is the bounding box that includes all the nets that are associated with a given move. When the congestion cost computation is thusly restricted, only the congested resources within the bounding box will impact the cost of the move.

Fine-Grained Approach (Per-Net Congestion Cost)

In some embodiments, the congestion cost that is factored in the placement cost may be a per-net congestion cost. In these embodiments, a fine-grained approach may be used when computing the congestion cost.

According to an example of the fine-grained approach, in one embodiment the congestion cost is computed per net. Only the channel resources that belong to the bounding box of the current net are considered when computing the congestion cost. While this approach is computationally more expensive, it tends to provide a better timing behavior because local congestion does not affect the non-congested areas of the digital block array. To compute the congestion cost per net, only the nets that are involved in a given move are considered.

In one embodiment, multi-terminal nets are broken into a set of two-terminal nets and a congestion cost value is computed for the source-sink pairs. One consequence of this may be that the channel resources that are closer to the source may be unnecessarily penalized. To avoid this consequence, a heuristic may be used to handle multi-terminal nets. For example, the sink terminals may be ordered based on their proximity to the source terminal, and then for each pair the previous sink may be used as the source.

Experimental Results

To evaluate the efficacy of the techniques for congestion-aware placement described herein, an example embodiment was used to perform experiments for an asymmetric FPGA architecture in which post-routing delay variances were computed for a set of industrial circuits. The experiment results showed maximum benefit for the global congestion cost case while limiting the congestion cost computation to the bounding box of the move. For these experiments multi-terminal nets were simply split into multiple source-sink pairs.

It is noted that for an asymmetric architecture, a placement which is optimized for timing delay is likely to have large sensitivity to perturbation and the delay values may change drastically even if there is a minor non-functional design change (e.g., such as a ECO-type change). However, according to the techniques described herein, the placement is made more uniform while minimizing the impact to net delays.

Table 3 below shows the experimental results obtained for an asymmetric FPGA architecture such as the architecture illustrated in FIG. 7. The maximum theoretical frequency for a circuit was computed based on the slacks computed by a static timing analyzer after placement and routing. The minimum, maximum, and mean values of the frequency were computed over ten runs, where for each run a different random number starting seed was used for simulated annealing. Minor changes in the design were emulated by changing the initial seed for the annealing process.

Specifically, Table 3 lists the average frequency and variance for the different clocks in the designs of the industrial circuits used for the experiments. The average frequency was the average across 10 runs. For each run, the spread between the maximum and minimum frequencies were computed as a percentage of the minimum frequencies. The variance reported was the maximum of those percentage spreads. For the test cases that have multiple clock domains, each clock domain is listed in separate row.

cients during the annealing process. Another key observation is that the average frequency is not degraded. This is achieved by not impacting the delay factor in the placement cost directly. Also, accounting for asymmetry by splitting the congestion cost helps in reducing the impact to the post-routing delays. In a few cases (marked in bold italics), the variance marginally increased with the congestion cost. This can be attributed to the fact that the initial seed change caused too much of a difference and the starting point at the beginning of the annealing process was in a completely different solution space. In these cases, the hill climbing during annealing was not very effective, contributing to increased variance at the end despite improved uniformity brought in by the factoring in of congestion.

Probabilistically Weighted Penalties

In some embodiments, only some of the segments that fall within the bounding box of a net may be used during actual routing. Thus, one possible enhancement to such embodiments would be to:
1. Pre-compute a table with less than (or equal to) four bends of all possible routes between a pair of terminals.
2. Compute the probability that a particular channel segment is used for a route between two points by taking the ratio of the total number of possible routes and the number of routes that actually use the segment.
3. When distributing the overlap penalty within the placement of a bounding box, distribute the penalty based on the probability that the specific segment is used.

Since the probabilistic usage table is pre-computed only once, there is no significant impact to the run-time usage of computing resources. On the other hand, the overlap penalties are more accurate leading to a better estimate of the congestion.

Example Embodiments and Alternatives

In one embodiment, the techniques for congestion-aware placement described herein may be implemented as a

TABLE 3

Experimental Results

| Design Circuit | Clocks | Without Congestion Coefficients | | With Congestion Coefficients | |
|---|---|---|---|---|---|
| | | Average Frequency (MHz) | Variance | Average Frequency (MHz) | Variance |
| A | Clock_2 | 46.5 | 10.7 | 46.4 | 3.6 |
| | Clock_3 | 51.3 | 2.8 | 51.5 | 0.1 |
| | Clock_1 | 42.7 | 10.5 | 42.8 | 8.3 |
| | Cybus_clk | 46.5 | 10.7 | 46.4 | 3.6 |
| B | Clock_2 | 47.1 | 10.3 | 46.5 | 6.2 |
| | Clock_3 | 38.1 | 2.0 | 37.8 | 2.0 |
| | *Clock_1* | *42.1* | *6.1* | *42.5* | *6.6* |
| | Cybus_clk | 38.1 | 2.0 | 37.8 | 2.0 |
| C | *Cybus_clk* | *16.0* | *7.6* | *15.8* | *8.3* |
| D | Clock_1 | 50.1 | 17.4 | 50.8 | 12.2 |
| E | *Clock_1* | *56.7* | *2.7* | *54.4* | *5.7* |
| F | Clock_1 | 45.4 | 7.2 | 44.4 | 3.9 |
| G | *Clock_1* | *45.1* | *4.2* | *45.8* | *4.3* |
| H | Clock_5 | 44.9 | 14.2 | 45.3 | 8.7 |
| | Clock_2 | 45.1 | 6.8 | 45.5 | 6.5 |
| | *Clock_3* | *45.4* | *7.7* | *44.9* | *10.3* |
| | *Clock_1* | *44.5* | *7.9* | *44.4* | *9.2* |
| | *Clock_4* | *44.8* | *6.8* | *45.4* | *7.8* |
| | Clock_6 | 44.8 | 10.1 | 45.6 | 7.4 |
| I | Clock_1 | 43.4 | 7.0 | 43.4 | 6.4 |
| M | Clock_1 | 75.4 | 17.3 | 75.6 | 9.7 |

As can be seen from Table 3, the variance was reduced when the placement cost function used congestion coefficients.

method, performed by one or more computer systems, for simulated annealing-based placement of an electronic design.

In this embodiment, the method comprises the steps of: determining a first state of the design by assigning a first instance, representing a first component, to a first location on an asymmetrical architecture, wherein the asymmetrical architecture comprises multiple control logic blocks, multiple horizontal (H) channels each having a first capacity, and multiple vertical (V) channels each having a second capacity, and wherein the first capacity is different from the second capacity; computing a first placement cost, which includes a first congestion cost, for the first state of the design; determining a second state of the design by assigning a second instance, representing a second component, to a second location on the asymmetrical architecture; computing a second placement cost, which includes a second congestion cost, for the second state of the design; computing a delta change as a difference between the first placement cost and the second placement cost; and determining whether to accept or to reject the second state of the design based on the delta change.

In one aspect of this embodiment, the method further comprises using a cost function to compute the first congestion cost and the second congestion cost, wherein using the cost function comprises assigning overlap penalties to one or more H channels and V channels.

In one aspect of this embodiment, the method further comprises using a cost function to compute the first congestion cost, wherein using the cost function comprises: determining at least one net that includes: one or more control logic blocks to which the first instance is assigned, and one or more H channels or V channels that connect the one or more logic blocks; and assigning overlap penalties to those of the one or more H channels or V channels which are included in one or more nets that are different from said at least one net. In this aspect, the step of using the cost function further comprises: computing a first portion, of the first congestion cost, for any H channels separately from computing a second portion, of the first congestion cost, for any V channels; and combining the first portion and the second portion to determine the first congestion cost.

In one aspect of this embodiment, the method further comprises using a cost function to compute the second congestion cost, wherein using the cost function comprises: determining at least one net that includes: one or more control logic blocks to which the second instance is assigned, and one or more H channels or V channels that connect the one or more logic blocks; and assigning overlap penalties to those of the one or more H channels or V channels which are included in one or more nets that are different from said at least one net. In this aspect, the step of using the cost function further comprises: computing a first portion, of the second congestion cost, for any H channels separately from computing a second portion, of the second congestion cost, for any V channels; and combining the first portion and the second portion to determine the second congestion cost.

In one aspect of this embodiment, the step of computing the first placement cost comprises minimizing a first combination of a first timing cost, a first bounding box cost, and the first congestion cost that are associated with the first state of the design, and the step of computing the second congestion cost comprises minimizing a second combination of a second timing cost, a second bounding box cost, and the second congestion cost that are associated with the second state of the design.

In one aspect of this embodiment, the first congestion cost and the second congestion cost are equal to a pre-determined value for completely uniform placement, and the first congestion cost and the second congestion cost are different from the pre-determined value for non-uniform placement.

In one aspect of this embodiment, the method further comprises using a heuristic based on a threshold to compute at least one of the first congestion cost and the second congestion cost.

In one aspect of this embodiment, the method further comprises one or more of: computing the first congestion cost across all nets included in the first state of the design; computing the second congestion cost across all nets included in the second state of the design; computing the first congestion cost based on a first bounding box for a first single net that includes first one or more control logic blocks to which the first instance is assigned; and computing the second congestion cost based on a second bounding box for a second single net that includes second one or more control logic blocks to which the second instance is assigned.

In another embodiment, the techniques for congestion-aware placement described herein may be implemented as a set of instructions that are stored on non-transitory computer-readable storage media. Such instructions, when executed by one or more processors, cause the one or more processors to perform the method (and its various aspects) for simulated annealing-based placement that is described above. In yet other embodiments, the techniques described herein may be embodied as an apparatus comprising one or more processors and non-transitory media that stores a set of instructions. The set of instructions, when executed by the one or more processors, causes the apparatus to perform the method (and its various aspects) that is described above.

Various alternative embodiments are contemplated to be within the spirit and scope of the techniques for congestion-aware placement described herein.

For example, various embodiments may use different approaches to factor in the congestion costs computed for an asymmetrical architecture. Examples of such approaches include, but are not limited to, the following computation equations:

$$PC = TC + BC + CC$$

$$PC = CC * TC + BC$$

$$PC = TC + CC * BC$$

where PC denotes a placement cost for a given state of an electronic design, TC denotes timing cost, BC denotes bounding box cost, and CC denotes the congestion cost for that state of the design.

In another example, various embodiments may use different computations to split the congestion coefficients of the design states before and after an annealing move.

In another example, various embodiments may use different thresholds and/or different threshold-based heuristics when combining and/or weighing the horizontal congestion costs and the vertical congestion costs.

In another example, various embodiments may use the CLBs of a digital block array as resources in addition to using the channel resources when assigning overlap penalties.

V. Timing-Critical Net-Based Routing

The techniques for reducing post-routing delay variance described herein include techniques for timing-critical net-based routing.

In an example embodiment, the techniques for timing-critical net-based routing are performed by a processing logic executed by a computer system. After performing placement to assign instances of digital components to locations on the architecture of a programmable target device, the processing logic performs routing by allocating routing resources to connect the nets that include the instances of the digital components. For example, during routing the processing logic determines the channels (and/or sub-channels thereof) and the corresponding switches that are needed to connect the placed nets.

As part of performing routing, according to the techniques described herein the processing logic determines a timing-critical priority for each net represented on the netlist of the design being routed, and then iteratively routes the nets based on their timing-critical priorities. At each iteration, a net having a higher timing-critical priority is routed before another net that has a lower timing-critical priority. In this manner, the processing logic ensures that timing-critical nets are routed first, thereby reducing the timing delay variance in the final routing.

To determine the timing-critical priorities, various embodiments may use various timing properties of the electronic design being routed. For example, in one embodiment a processing logic may use the timing criticality of one or more components of the design and/or the number of fan-outs for one or more component instances to determine the timing-critical priority of the nets represented in the design. In some embodiments, the timing-critical priorities of the nets may be data elements (e.g., data values, data objects, etc.) that are stored in association with their corresponding nets. Such data elements may be implemented in any suitable data structures that are stored on volatile and/or non-volatile storage media. Examples of such data structures include, but are not limited to, files, tables, lists, data records (e.g., records stored in relational, hierarchical, or object-oriented databases), data objects instantiated from object-oriented classes, arrays, and/or any other suitable structured data arrangements that can store persistent or in-memory data.

In one embodiment, the processing logic performs routing by executing a path-finding process that attempts to route one net at a time. The path-finding process organizes the nets from a netlist into a graph, and then searches for suitable routing solutions by traversing the graph. Once the path-finding process has routed N number of nets (where N>=2), it computes how many edges on the graph are overused. If two nets use the same edge, then the path-finding process increases a cost associated with the edge, and then performs another iteration to route the N nets again by taking into account the assigned edge costs. Thus, the difference between the two iterations is the cost of the underlying graph changes based on edge overuse. For example, if in the first iteration two nets are overusing the same edge, before the second iteration the cost of that edge is increased. Then, during the second iteration, one net will use the edge and another net will not use the edge. In conventional path-finding algorithms, determining which net will use an overused edge is based on heuristics that are typically related to the amount of overuse.

According to the techniques described herein, the path-finding process uses information indicating which nets are timing-critical in addition to, or instead of, using conventional heuristics based on edge overuse. In some embodiments, such information is the timing-critical priority of each net, and in these embodiments the path-finding process is configured to determine which nets have a higher priority and to route these nets first. This improves the search for a desired routing solution in two ways: first, more importance is given to timing-critical nets; and second, the post-routing delay variance is decreased because the interrelated timing-criticality of the nets is effectively imposing the order in which the nets are routed. Thus, the techniques for timing-critical routing described herein reduce post-routing delay variance because they are more deterministic than conventional path-finding approaches that rely only on edge overuse.

In one embodiment, the techniques for timing-critical net-based routing described herein may be implemented as a method performed by one or more computer systems. In this embodiment, the method comprises the steps of: determining timing-critical priorities for multiple nets that are represented on a netlist, wherein the netlist describes components and connectivity of an electronic design, and wherein placement of instances representing the components on the netlist has been completed; and iteratively routing the multiple nets based on the timing-critical priorities, wherein at each iteration a first net that has a higher timing-critical priority is routed before a second net that has a lower timing-critical priority.

In another embodiment, the techniques for timing-critical net-based routing described herein may be implemented as a set of instructions that are stored on non-transitory computer-readable storage media. Such instructions, when executed by one or more processors, cause the one or more processors to perform the method that is described above. In yet other embodiments, the techniques described herein may be embodied as an apparatus comprising one or more processors and non-transitory media that stores a set of instructions. The set of instructions, when executed by the one or more processors, causes the apparatus to perform the method that is described above.

Various alternative embodiments are contemplated to be within the spirit and scope of the techniques for timing-critical net-based routing described herein. For example, various embodiments may employ different approaches in using the timing-critical priorities determined for the nets of a placed design. Such approaches include, but are not limited to: using different heuristics for ordering the nets based on their timing-critical priorities during path-finder iterations; using different timing-critical priority ordering heuristics for different iterations; and using timing-critical priority ordering for some iteration(s) but not for others.

VI. Selected Additional Embodiments

In various embodiments, the techniques for reducing post-routing delay variance may comprise a combination of operations that include two or more of the canonical instance ordering, congestion-ware annealing-based placement, and timing-critical net-based routing operations that are described herein.

For example, in one embodiment the techniques for reducing post-routing delay variance described herein may be implemented as a method performed by one or more computer systems. In this embodiment, the method comprises one or more of: generating a canonical instance ordering for a netlist, wherein the netlist comprises multiple instances that represent digital components of an electronic design; performing annealing-based placement to assign multiple instances of digital components to locations on an asymmetrical architecture, wherein the asymmetrical architecture comprises multiple control logic blocks, multiple horizontal (H) channels each having a first capacity, and multiple vertical (V) channels each having a second capacity, wherein the first capacity is different from the second capacity, and wherein performing the annealing-based placement comprises: computing one or more placement costs that include one or more respective congestion costs, and placing the multiple instances based on the one or more placement costs; and performing routing of placed instances of digital components, wherein performing the routing comprises: determining timing-critical priorities for multiple nets that are represented by the placed instances, and iteratively routing the multiple nets based on the timing-critical priorities of the multiple nets, wherein at each iteration a net having a higher timing-critical priority is routed before another net that has a lower timing-critical priority.

In another example, in one embodiment the techniques for reducing post-routing delay variance described herein may be implemented as a method performed by one or more computer systems. In this embodiment, the method comprises the steps of: generating a canonical instance ordering for a netlist, wherein the netlist comprises multiple instances that represent digital components of an electronic design for an asymmetrical architecture, wherein the asymmetrical architecture comprises multiple control logic blocks, multiple horizontal (H) channels each having a first capacity, and multiple vertical (V) channels each having a second capacity, and wherein the first capacity is different from the second capacity; and performing annealing-based placement of the multiple instances based on the canonical instance ordering, wherein performing the annealing-based placement comprises: computing one or more placement costs that include one or more respective congestion costs, and placing the multiple instances onto the asymmetrical architecture based on the one or more placement costs. In one aspect, the method further comprises performing routing after performing the annealing-based placement. In various implementations of this aspect, performing the routing may comprise: determining timing-critical priorities for multiple nets that are represented on the netlist; and iteratively routing the multiple nets based on the timing-critical priorities, wherein at each iteration a first net that has a higher timing-critical priority is routed before a second net that has a lower timing-critical priority.

In other embodiments, the techniques reducing post-routing delay variance described herein may be implemented as a set of instructions that are stored on non-transitory computer-readable storage media. Such instructions, when executed by one or more processors, cause the one or more processors to perform the methods (and their aspects) that are described above. In yet other embodiments, the techniques described herein may be embodied as an apparatus comprising one or more processors and non-transitory media that stores a set of instructions. The set of instructions, when executed by the one or more processors, causes the apparatus to perform the methods (and their aspects) that are described above.

Various embodiments of the techniques for reducing post-routing delay variance described herein described herein may include various operations. These operations may be performed by hardware components, software, firmware, or a combination thereof. As used herein, the term "coupled to" may mean coupled directly or indirectly through one or more intervening components. Any of the signals provided over various buses and switches described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method for reducing post-routing delay variance, the method comprising:
receiving a first netlist, wherein the netlist comprises first multiple instances that represent digital components of an electronic design;
assigning a base signature to each instance on the first netlist, wherein the base signature is based on two or more design or connectivity attributes of said each instance;
generating a first instance ordering based on first base signatures assigned to the first netlist, wherein the first instance ordering represents an order of the first multiple instances on the first netlist;
receiving a second netlist that represents the electronic design, wherein the second netlist comprises second multiple instances, the second multiple instances including one or more instances that differ from the first multiple instances on the first netlist;
assigning second base signatures to the second multiple instances on the second netlist; and
generating a second instance ordering based on the second base signatures assigned to the second netlist, wherein the second instance ordering preserves the same order as the first instance ordering for those instances that are included in both the first netlist and the second netlist;
wherein generating the second instance ordering is performed before any placement and routing has been performed;
wherein the method is performed by one or more computer systems.

2. The method of claim 1, further comprising performing one or more of packing, placement, and routing based on the second instance ordering.

3. The method of claim 1, wherein:
generating the first instance ordering comprises applying a mapping function based on the first base signatures;
generating the second instance ordering comprises applying the mapping function based on the second base signatures; and
the mapping function is independent of name identifiers and initial positions of individual instances on the first or the second netlist.

4. The method of claim 1, further comprising generating a particular base signature for a particular instance from the first or the second netlist based on the two or more design or connectivity attributes of the particular instance, and wherein the two or more design or connectivity attributes include two or more of:
a module type of the particular instance;
first terminal node names of the particular instance;
second terminal node names to which one or more of a fan-in and a fan-out of the particular instance are connected to;
integer attributes of the particular instance; and
a string representing an equation when the particular instance represents a macro-cell component.

5. The method of claim 1, wherein two instances from the first or the second netlist are assigned the same base signature only if the two instances represent two digital components that are structurally equivalent.

6. The method of claim 1, further comprising:
sorting the first netlist based on the first base signatures;
for each instance on the first netlist, generating a fan-in signature for said each instance and generating a combined signature based on the base signature and the fan-in signature of said each instance; and sorting the first netlist based on the combined signatures generated for the first netlist;

wherein generating the first instance ordering comprises generating the first instance ordering based on the combined signatures for the first netlist.

7. The method of claim 6, further comprising one or more of:

after sorting the first netlist based on the first base signatures, performing tie-breaking for any instances that are assigned the same base signature; and after sorting the first netlist based on the combined signatures, performing tie-breaking for any instances that are assigned the same combined signature.

8. The method of claim 1, further comprising:

for each instance on the second netlist that is not on the first netlist, generating a fan-in signature for said each instance and generating a combined signature based on the base signature and the fan-in signature of said each instance; and sorting the second netlist based on the combined signatures generated for the second netlist;

wherein generating the second instance ordering comprises generating the second instance ordering based on the combined signatures of the second netlist.

9. The method of claim 8, further comprising one or more of:

after sorting the second netlist based on the second base signatures, performing tie-breaking for any instances that are assigned the same base signature; and after sorting the second netlist based on the combined signatures, performing tie-breaking for any instances that are assigned the same combined signature.

10. The method of claim 1, wherein a difference between the second netlist and the first netlist is based on an engineering change order (ECO), and wherein the difference includes one or more of:

the second netlist includes a different number of instances from the first netlist; and an attribute of a particular instance on the second netlist is different from the same attribute of the same particular instance on the first netlist.

11. A non-transitory computer-readable medium storing a set of instructions that comprise instructions which, when executed by one or more processors, cause the one or more processors to perform steps comprising:

receiving a first netlist, wherein the netlist comprises first multiple instances that represent digital components of an electronic design;

assigning a base signature to each instance on the first netlist, wherein the base signature is based on two or more design or connectivity attributes of said each instance;

generating a first instance ordering based on first base signatures assigned to the first netlist, wherein the first instance ordering represents an order of the first multiple instances on the first netlist;

receiving a second netlist that represents the electronic design, wherein the second netlist comprises second multiple instances, the second multiple instances including one or more instances that differ from the first multiple instances on the first netlist;

assigning second base signatures to the second multiple instances on the second netlist; and generating a second instance ordering based on the second base signatures assigned to the second netlist, wherein the second instance ordering preserves the same order as the first instance ordering for those instances that are included in both the first netlist and the second netlist;

wherein generating the second instance ordering is performed before any placement and routing has been performed.

12. The non-transitory computer-readable medium of claim 11, wherein the set of instructions further comprises instructions which, when executed by the one or more processors, cause the one or more processors to perform one or more of packing, placement, and routing based on the second instance ordering.

13. The non-transitory computer-readable medium of claim 11, wherein:

the instructions that cause generating the first instance ordering comprise instructions which, when executed by the one or more processors, cause the one or more processors to apply a mapping function based on the first base signatures;

the instructions that cause generating the second instance ordering comprise instructions which, when executed by the one or more processors, cause the one or more processors to apply the mapping function based on the second base signatures; and the mapping function is independent of name identifiers and initial positions of individual instances on the first or the second netlist.

14. The non-transitory computer-readable medium of claim 11, wherein the set of instructions further comprises instructions which, when executed by the one or more processors, cause the one or more processors to perform generating a particular base signature for a particular instance from the first or the second netlist based on the two or more design or connectivity attributes of the particular instance, and wherein the two or more design or connectivity attributes include two or more of:

a module type of the particular instance;

first terminal node names of the particular instance;

second terminal node names to which one or more of a fan-in and a fan-out of the particular instance are connected to;

integer attributes of the particular instance; and a string representing an equation when the particular instance represents a macro-cell component.

15. The non-transitory computer-readable medium of claim 11, wherein two instances from the first or the second netlist are assigned the same base signature only if the two instances represent two digital components that are structurally equivalent.

16. The non-transitory computer-readable medium of claim 11, wherein the set of instructions further comprises instructions which, when executed by the one or more processors, cause the one or more processors to perform:

sorting the first netlist based on the first base signatures;

for each instance on the first netlist, generating a fan-in signature for said each instance and generating a combined signature based on the base signature and the fan-in signature of said each instance; and sorting the first netlist based on the combined signatures generated for the first netlist;

wherein generating the first instance ordering comprises generating the first instance ordering based on the combined signatures for the first netlist.

17. The non-transitory computer-readable medium of claim 16, wherein the set of instructions further comprises instructions which, when executed by the one or more processors, cause the one or more processors to perform one or more of:

after sorting the first netlist based on the first base signatures, performing tie-breaking for any instances that are assigned the same base signature; and after sorting the first netlist based on the combined signatures, performing tie-breaking for any instances that are assigned the same combined signature.

18. The non-transitory computer-readable medium of claim 11, wherein the set of instructions further comprises instructions which, when executed by the one or more processors, cause the one or more processors to perform:

for each instance on the second netlist that is not on the first netlist, generating a fan-in signature for said each instance and generating a combined signature based on the base signature and the fan-in signature of said each instance; and sorting the second netlist based on the combined signatures generated for the second netlist;

wherein generating the second instance ordering comprises generating the second instance ordering based on the combined signatures of the second netlist.

19. The non-transitory computer-readable medium of claim 18, wherein the set of instructions further comprises instructions which, when executed by the one or more processors, cause the one or more processors to perform one or more of:

after sorting the second netlist based on the second base signatures, performing tie-breaking for any instances that are assigned the same base signature; and after sorting the second netlist based on the combined signatures, performing tie-breaking for any instances that are assigned the same combined signature.

20. The non-transitory computer-readable medium of claim 11, wherein a difference between the second netlist and the first netlist is based on an engineering change order (ECO), and wherein the difference includes one or more of:

the second netlist includes a different number of instances from the first netlist; and an attribute of a particular instance on the second netlist is different from the same attribute of the same particular instance on the first netlist.

* * * * *